(12) United States Patent
Fritchman et al.

(10) Patent No.: US 10,198,399 B1
(45) Date of Patent: Feb. 5, 2019

(54) CRYPTOGRAPHICALLY SECURE MACHINE LEARNING

(71) Applicant: KenSci Inc., Seattle, WA (US)

(72) Inventors: Kyle Josiah Fritchman, Tacoma, WA (US); Tyler John Hughes, Seattle, WA (US); Ankur Teredesai, Bellevue, WA (US); Martine Ivonne Leo De Cock, Bellevue, WA (US); Anderson Nascimento, University Place, WA (US)

(73) Assignee: KenSci Inc., Seattle, WA (US)

( * ) Notice: Subject to any disclaimer, the term of this patent is extended or adjusted under 35 U.S.C. 154(b) by 0 days.

(21) Appl. No.: 15/913,864

(22) Filed: Mar. 6, 2018

(51) Int. Cl.
| | |
|---|---|
| G06F 15/18 | (2006.01) |
| G06N 5/04 | (2006.01) |
| G06K 9/62 | (2006.01) |
| G06F 21/60 | (2013.01) |
| H04L 9/00 | (2006.01) |

(52) U.S. Cl.
CPC ............ G06F 15/18 (2013.01); G06F 21/602 (2013.01); G06K 9/6267 (2013.01); G06N 5/04 (2013.01); H04L 9/008 (2013.01); *H04L 2209/46* (2013.01); *H04L 2209/50* (2013.01)

(58) Field of Classification Search
CPC ......... G06F 15/18; G06F 21/602; G06N 5/04; G06K 9/6267; H04L 9/008; H04L 2209/46; H04L 2209/50
USPC ........................................................ 706/12
See application file for complete search history.

(56) References Cited

U.S. PATENT DOCUMENTS

| | | | |
|---|---|---|---|
| 2008/0065910 A1* | 3/2008 | Agrawal | G06F 17/30545 713/193 |
| 2012/0201378 A1* | 8/2012 | Nabeel | H04L 9/008 380/255 |
| 2012/0233460 A1* | 9/2012 | Kamara | H04L 9/3218 713/168 |

OTHER PUBLICATIONS

DeCock M. et al., "Efficient and Private Scoring of Decision Trees, Support Vector Machines and Logistic Regression Models based on Pre-Computation", IEEE, 2017.*

* cited by examiner

*Primary Examiner* — Dave Misir
(74) *Attorney, Agent, or Firm* — John W. Branch; Lowe Graham Jones PLLC

(57) ABSTRACT

Embodiments are directed towards classifying data. A machine learning (ML) engine may select an ML model that may employ a cryptographic multi-party computation (MPC) protocol based on model preferences, including a parameter model, provided by a client. A randomness engine may be employed to provide random values and other random values based on the MPC protocol such that the random values may be provided to the client and the other random values may be provided to an answer engine. Input values that correspond to fields in the parameter model may be provided by the client such that the input values may be based on the MPC protocol and the random values. The answer engine may be employed to provide partial results to the question based on the ML model, the input values, and the MPC protocol that may be provided to the client.

26 Claims, 12 Drawing Sheets

US 10,198,399 B1

CRYPTOGRAPHICALLY SECURE MACHINE LEARNING

TECHNICAL FIELD

The present invention relates generally to machine learning and, more particularly, but not exclusively to methods for sharing or distributing machine learning models.

BACKGROUND

Machine learning is increasingly playing a larger and more important role in developing or improving the understanding of complex systems. As machine learning techniques have matured, machine learning has rapidly moved from the theoretical to the practical. Combined with the advent of big-data technology, machine learning solutions are being applied to a variety of industries and applications that until now were difficult, if not impossible to effectively reason about. As such, there has been an explosion of the development of different types of machine learning models that may be used predicting outcomes for different system. In some cases, some organizations may expend significant resources to develop or train machine learning models directed to different question spaces. Also, since training and tuning machine learning models may be difficult or time consuming, other organizations may be interested in using machine learning models that have been trained and tuned by other organizations. However, using public or shared machine learning models may be difficult for organizations that have secret or private information they are interested in classifying using other organizations' machine learning models. For example, undesirable sharing of private or confidential information with the owner of the shared machine learning models may be required. Likewise, other organizations that own trained models may be discouraged from sharing their trained models with others. For example, developing, training, or tuning machine learning models may be expensive or proprietary. Thus, in this example, simply providing a tuned and trained model to another organization may be disadvantageous since some or all of the internal details developed through training or tuning may be discernable by others when using it.

Accordingly, practical sharing, or the like, of machine learning models may be difficult and impractical. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of the Various Embodiments, which is to be read in association with the accompanying drawings, wherein.

DETAILED DESCRIPTION OF THE VARIOUS EMBODIMENTS

Figure 1:
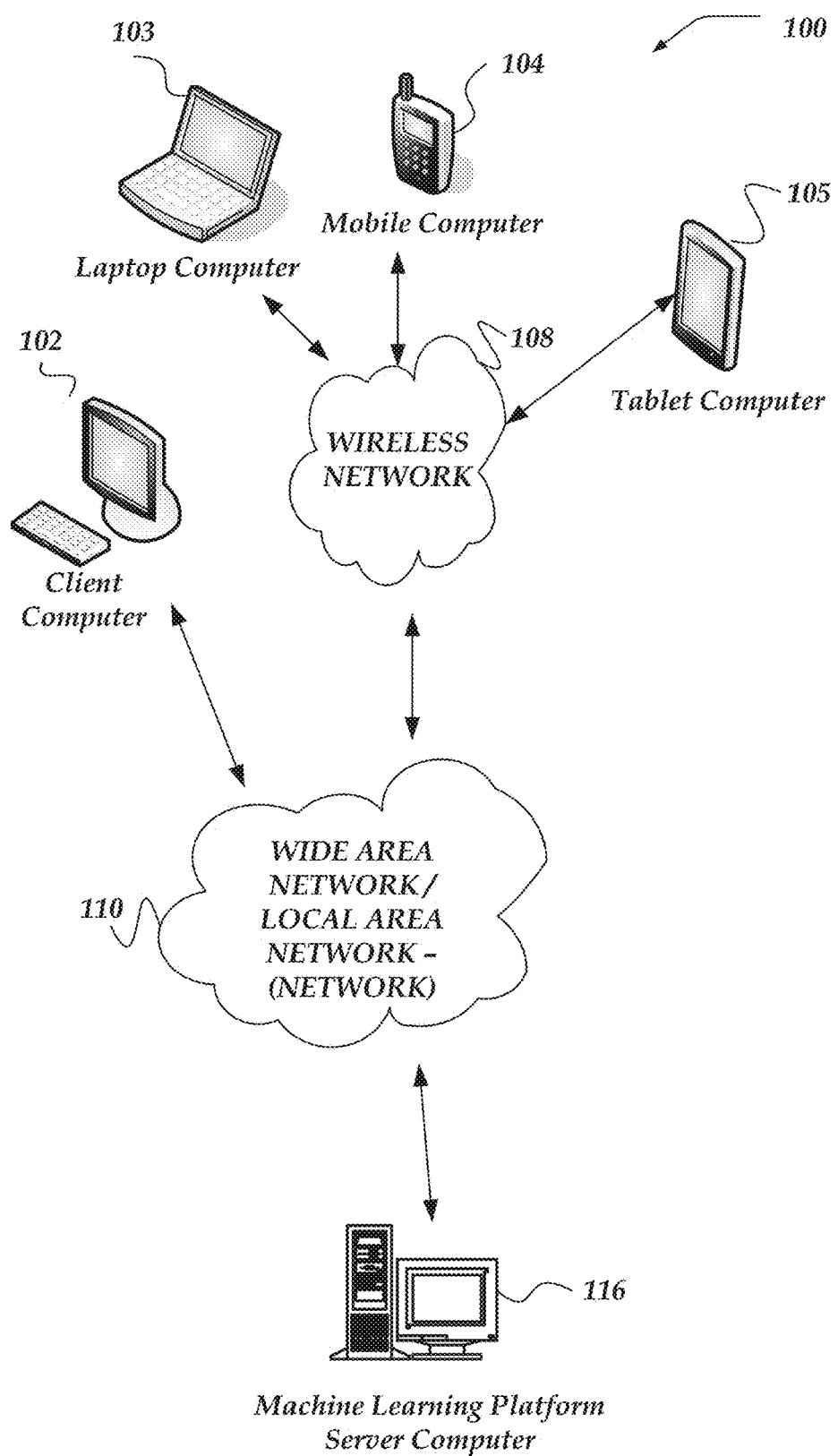
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. Also, throughout the specification and the claims, the use of "when" and "responsive to" do not imply that associated resultant actions are required to occur immediately or within a particular time period. Instead they are used herein to indicate actions that may occur or be performed in response to one or more conditions being met, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, JavaScript, Ruby, VBScript, Microsoft .NET™ languages such as C#, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the terms "raw data set," or "raw data" refer to data sets provided by an organization that may represent the items to be included ingested for use in a machine learning repository. In some embodiments raw data may be provided in various formats. In simple cases, raw data may be provided in spreadsheets, databases, csv files, or the like. In other cases, raw data may be provided using structured XML files, tabular formats, JSON files, or the like. In one or more of the various embodiments, raw data in this context may be the product one or more preprocessing operations. For example, one or more pre-processing operations may be executed on information, such as, log files, data dumps, event logs, database dumps, unstructured data, structured data, or the like, or combination thereof. In some cases, the pre-processing may include data cleansing, filtering, or the like. The particular pre-processing operations may be specialized based on the source, context, format, veracity of the information, or the like. In some cases raw data may include sensitive or confidential information, such as, proprietary information, patient information, or other personally identifiable information.

As used herein, the term "raw data objects" refer to objects that comprise raw datasets. For example, if a raw dataset is comprised of a plurality of tabular record sets, the separate tabular record sets may be considered raw data objects.

As used herein, the term "model object" refers to an object that models various characteristics of an entity or data object. Model objects may include one or more model object fields that represent features or characteristics. Model objects, model object fields, or model object relationship may be governed by a model schema.

As used herein, the term "model schema" refers to a schema that defines model object types, model object features, model object relationships, or the like, that may be supported by the machine learning repository. For example, raw data objects are transformed into model objects that conform to a model schema supported by the machine learning platform.

As used herein, the term "data model" refers to a data structure that represents one or more model objects and their relationships. A data model will conform to a model schema supported by the machine learning platform.

As used herein, the term "parameter model" refers to a data structure that represents one or more model objects ML models may be arranged to support. A data model that includes model objects may be provided to a ML model if the data model satisfies the requirements of the ML model's parameter model.

As used herein, the terms "machine learning model" or "ML model" refer to machine learning models that may be arranged for scoring or evaluating model objects. The particular type of ML model and the questions it is designed to answer will depend on the application the ML model targets. ML models are associated with parameter models that define model objects that the ML model supports.

As used herein, the terms "tree model" or "tree data model" refer to machine learning models that represent tree-style ML models, such as, decision trees, random forests, or boosted decision tree models. The particular type of tree model and the questions it is designed to answer will depend on the design, purpose, or application the tree model.

As used herein, the term "secure machine learning model" refers to a machine learning model that is arranged such that one or more internal values or components are obscured using one or more cryptographic methods. The purpose of the model, its shape, parameter model, and type of questions it is trained to answer may be exposed or discoverable. However, the values of one or more internal components, such as, coefficients, threshold values, weights, or the like, are encrypted to hide the details of the model. Accordingly, one organization may design, train, or tune a secure ML model and let other organizations use it without divulging some or all of the internal details of the ML model.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards classifying data. In one or more of the various embodiments, a machine learning (ML) engine may be employed to select an ML model that may employ a cryptographic multi-party computation (MPC) protocol based on model preferences provided by a client such that the provided model preferences include both a question and a parameter model. In one or more of the various embodiments, selecting the ML model may include: comparing the parameter model with one or more other parameter models that may be associated with one or more ML models such that the one or more ML models remain encrypted during the comparison; and selecting the ML model from the one or more ML models based on the comparison.

In one or more of the various embodiments, a randomness engine may be employed to provide one or more random values and one or more other random values based on the MPC protocol such that the one or more random values are provided to the client and the one or more other random values may be provided to an answer engine. In some embodiments, the one or more random values and the one or more other random values may be correlated with each other based on the MPC protocol. In one or more of the various embodiments, employing the randomness engine, may include: distributing a first of instance of the randomness engine and a first random information datastore to the client such that the one or more random values are provided from the first random information datastore; distributing a second instance of the randomness engine and a second random information datastore to the answer engine such that the one or more other random values are provided from the second random information datastore; and employing the answer engine to synchronize the first random information datastore and second random information datastore to maintain a correlation between the one or more random values and the one or more other random values.

Further, in one or more of the various embodiments, the randomness engine may be employed to generate randomness information that includes the one or more random values and the one or more random values based on the MPC protocol. In one or more of the various embodiments, the randomness engine may be employed to store the randomness information in a persistent data store. In one or more of the various embodiments, the randomness engine may be employed to discard the one or more random values from the persistent datastore as they are provided to the client. And, in one or more of the various embodiments, the randomness engine may be employed to discard the one or more other random values from the persistent datastore as they are provided to the answer engine.

In one or more of the various embodiments, the answer engine may be employed to receive, from the client, one or more input values that correspond to one or more fields in the parameter model such that the one or more input values may be based on the MPC protocol and the one or more random values. In one or more of the various embodiments, the one or more input values may be secured using oblivious input selection.

In one or more of the various embodiments, the answer engine may be employed to provide one or more partial results to the question based on the ML model, the one or more input values, and the MPC protocol.

In one or more of the various embodiments, the answer engine may be employed to provide the one or more partial results to the client such that a ML client engine provides one or more answers to the question based on the one or more partial results. In one or more of the various embodiments, providing the one or more partial results to the question may include: evaluating nodes of one or more decision trees included in the ML model by computing secure partial results that correspond to each node of the one or more decision trees; generating a polynomial from the secure partial results that represents a path through the one or more decision trees; and providing the polynomial to the client and the answer engine such that the terms of the polynomial are secured using the MPC protocol. In one or more of the various embodiments, providing the one or more partial results to the question, may include, evaluating one or more of, one or more decision tree models, one or more random forest models, one or more heuristics, or one or more filters, that are included in the selected ML model.

Illustrated Operating Environment

FIG. 1 shows components of one embodiment of an environment in which embodiments of the invention may be practiced. Not all the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, machine learning platform server computer 116, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), universally unique identifiers (UUIDs), or other device identifiers. Such information may be provided in a network packet, or the like, sent between other client computers, machine learning platform server computer 116, or other computers.

Client computers 102-105 may further be configured to include a client application that enables an end-user to log into an end-user account that may be managed by another computer, such as machine learning platform server computer 116, or the like. Such an end-user account, in one non-limiting example, may be configured to enable the end-user to manage one or more online activities, including in one non-limiting example, project management, software development, system administration, data modeling, search activities, social networking activities, browse various websites, communicate with other users, provide inputs for secure machine learning classification, or the like. Also, client computers may be arranged to enable users to display reports, interactive user-interfaces, or results provided by machine learning platform server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, machine learning platform server computer 116, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of machine learning engine server computer 116 is described in more detail below in conjunction with FIG. 3. Briefly, however, machine learning model platform server computer 116 includes virtually any network computer that is specialized to provide data modeling or machine learning services as described herein.

Although FIG. 1 illustrates machine learning platform server computer 116 as a single computer, the innovations and/or embodiments are not so limited. For example, one or more functions of machine learning platform server computer 116, or the like, may be distributed across one or more distinct network computers. Moreover, machine learning model platform server computer 116 is not limited to a particular configuration such as the one shown in FIG. 1. Thus, in one embodiment, machine learning platform server computer 116 may be implemented using a plurality of network computers. In other embodiments, server computers may be implemented using a plurality of network computers in a cluster architecture, a peer-to-peer architecture, or the like. Further, in at least one of the various embodiments, machine learning model platform server computer 116 may be implemented using one or more cloud instances in one or more cloud networks. Accordingly, these innovations and embodiments are not to be construed as being limited to a single environment, and other configurations, and architectures are also envisaged.

Illustrative Client computer

Figure 2:
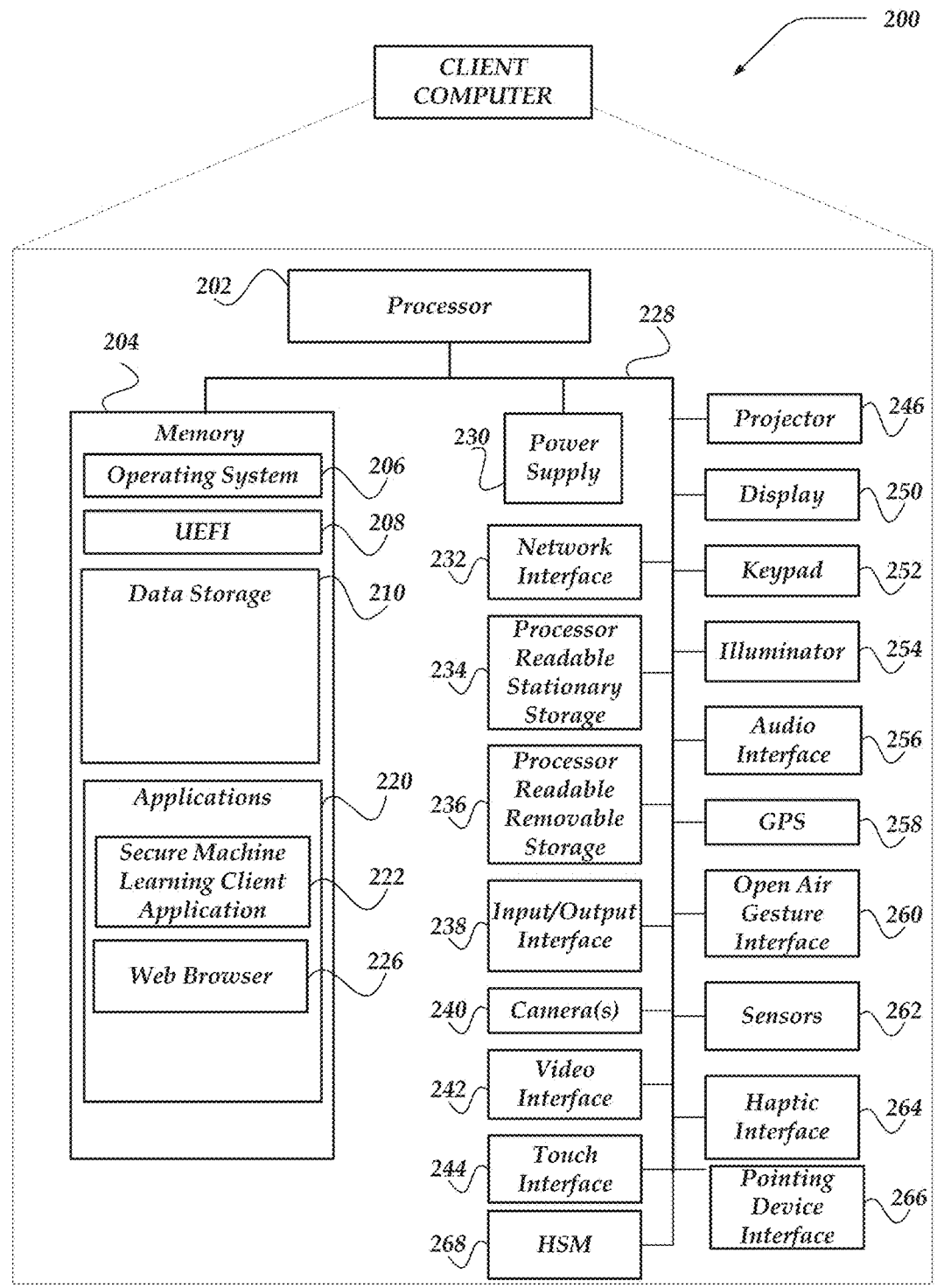
FIG. 2 shows a schematic embodiment of a client computer.

FIG. 2 shows one embodiment of client computer 200 that may include more or less components than those shown.

Client computer 200 may represent, for example, at least one embodiment of mobile computers or client computers shown in FIG. 1.

Client computer 200 may include one or more processors, such as processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope, accelerometer, or the like may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, electronic paper, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, Bluetooth Low Energy. or the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

In at least one of the various embodiments, applications, such as, secure machine learning client application 222, web browser 226, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 258. Also, in some embodiments, geolocation information may include information provided using one or more geolocation protocols over the networks, such as, wireless network 108 and/or network 111.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™, Bluetooth Low Energy, or the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store Unified Extensible Firmware Interface (UEFI) 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™. The operating system may include, or interface with a Java and/or JavaScript virtual machine modules that enable control of hardware components and/or operating system operations via Java application programs or JavaScript programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, user credentials, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, secure machine learning client application 222, web browser 226, or the like. In at least one of the various embodiments, secure machine learning client application 222 may be used to interact with a machine learning platform server computer, such as machine learning platform server computer 116.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of one or more CPUs, such as, an Application Specific Integrated Circuits (ASICs), Field Programmable Gate Arrays (FPGAs), Programmable Array Logic (PAL), or the like, or combination thereof. The embedded logic hardware devices may directly execute embedded logic to perform actions. Also, in one or more embodiments (not shown in the figures), the client computer may include one or more hardware microcontrollers instead of one or more CPUs. In at least one embodiment, the microcontrollers be system-on-a-chips (SOCs) that may directly execute their own embedded logic to perform actions and access their own internal memory and their own external Input and Output Interfaces (e.g., hardware pins and/or wireless transceivers) to perform actions.

Illustrative Network Computer

Figure 3:
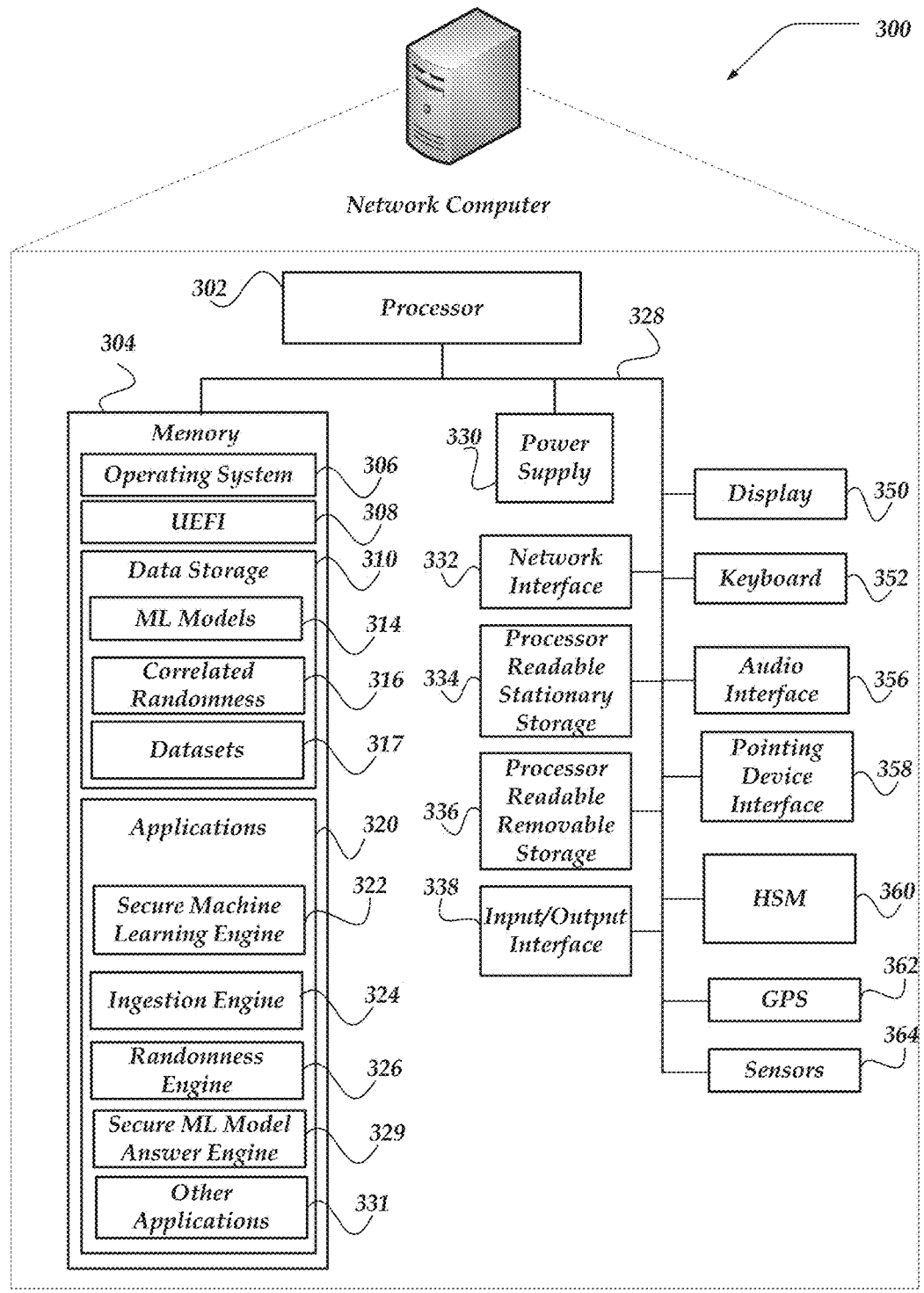
FIG. 3 illustrates a schematic embodiment of a network computer.

FIG. 3 shows one embodiment of network computer 300 that may be included in a system implementing one or more embodiments of the described innovations. Network computer 300 may include more or less components than those shown in FIG. 3. However, the components shown are sufficient to disclose an illustrative embodiment for practicing these innovations. Network computer 300 may represent, for example, one embodiment of machine learning platform server computer 116 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300. In some embodiments, processor 302 may be a multiprocessor system that includes one or more processors each having one or more processing/execution cores.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), and/or other types of non-transitory computer readable and/or writeable media. Memory 304 illustrates an example of computer-readable storage media (devices) for storage of information such as computer-readable instructions, data structures, program modules or other data. Memory 304 stores a unified extensible firmware interface (UEFI) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by one or more processors, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, machine learning (ML) models 314, correlated randomness 316, datasets 317 (e.g., customer data sets, validation data sets, training data sets, or the like), or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include secure machine learning (ML) engine 322, ingestion engine 324, randomness engine 326, secure ML model answer engine 329, other applications 331, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In at least one of the various embodiments, applications, such as, secure machine learning (ML) engine 322, ingestion engine 324, randomness engine 326, secure ML model answer engine 329, other applications 331, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 362. Also, in some embodiments, geolocation information may include information provided using one or more geolocation protocols over the networks, such as, wireless network 108 and/or network 110.

Furthermore, in at least one of the various embodiments, secure machine learning (ML) engine 322, ingestion engine 324, randomness engine 326, secure ML model answer engine 329, other applications 331, or the like, may be operative in a cloud-based computing environment. In at least one of the various embodiments, these engines, and others, that comprise the machine learning model repository that may be executing within virtual machines and/or virtual servers that may be managed in a cloud-based based computing environment. In at least one of the various embodiments, in this context applications including the engines may flow from one physical network computer within the cloud-based environment to another depending on performance and scaling considerations automatically managed by the cloud computing environment. Likewise, in at least one of the various embodiments, virtual machines and/or virtual servers dedicated to one or more of secure machine learning (ML) engine 322, ingestion engine 324, randomness engine 326, secure ML model answer engine 329, other applications 331, or the like, may be provisioned and de-commissioned automatically.

Further, in some embodiments, network computer 300 may also include hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

Additionally, in one or more embodiments (not shown in the figures), network computer 300 may include an one or more embedded logic hardware devices instead of one or more CPUs, such as, Application Specific Integrated Circuits (ASICs), Field Programmable Gate Arrays (FPGAs), Programmable Array Logic (PALs), or the like, or combination thereof. The one or more embedded logic hardware devices may directly execute its embedded logic to perform actions. Also, in one or more embodiments (not shown in the figures), the network computer may include one or more hardware microcontrollers instead of one or more CPUs. In at least one embodiment, the one or more microcontrollers may directly execute embedded logic to perform actions and access their own internal memory and their own external Input and Output Interfaces (e.g., hardware pins and/or wireless transceivers) to perform actions. E.g., they may be arranged as Systems On Chips (SOCs).

Illustrative Logical System Architecture

Figure 4:
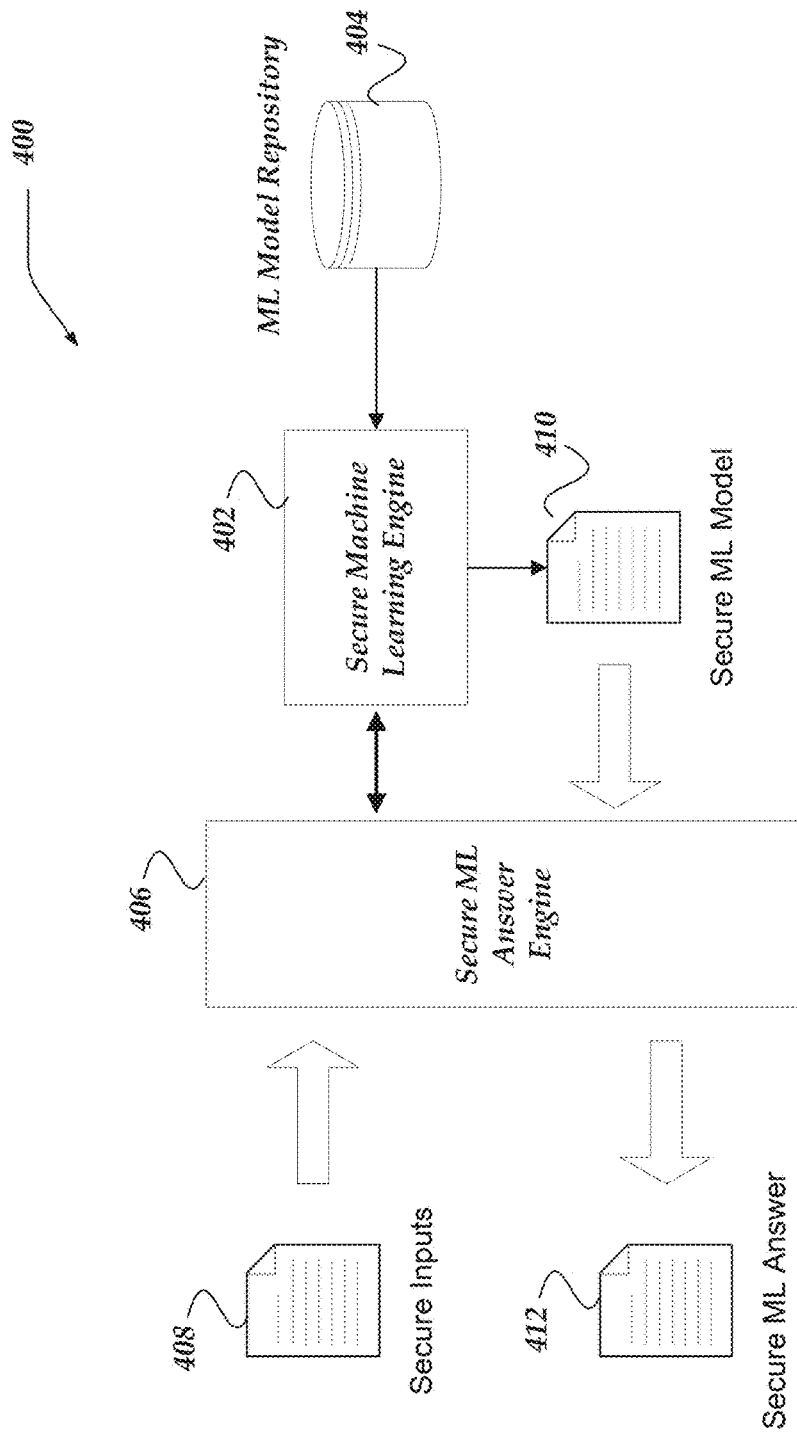
FIG. 4 shows a logical schematic of a portion of a machine learning platform system for cryptographically secure machine learning in accordance with one or more of the various embodiments.

FIG. 4 shows a logical schematic of a portion of machine learning platform system 400 for cryptographically secure machine learning in accordance with one or more of the various embodiments. In one or more of the various embodiments, system 400 represents logical interactions between or among secure machine learning (ML) engine 322, ingestion engine 324, randomness engine 326, secure ML model answer engine 329, other applications 331, or the like, that may be hosted by one or more network computers, such as, as network computer 300.

In one or more of the various embodiments, system 400 may include secure ML engine 402, ML model repository 404, secure ML answer engine 406, one or more secure inputs 408, one or more secure ML Models 410, one or more secure ML answers 412, or the like.

In one or more of the various embodiments, secure ML answer engine 406 and secure ML engine 402 may be arranged to enable cryptographically secure ML in accordance with one or more of the various embodiments. In some embodiments, a client application, such as, secure ML client application 222 running on a client computer, such as, client computer 200, may provide cryptographically secure input data, such as, secure inputs 408, to secure ML answer engine 406. In some embodiments, secure ML answer engine 408 may be arranged to employ one or more secure ML models, such as, secure ML model 410 to classify secure inputs 408. In some embodiments, the results of the classification operations, such as secure ML answer 414 may be provided to the client or user as a report, encoded data (e.g., JSON, XML, or the like), user-interface display, or the like, or combination thereof.

In one or more of the various embodiments, secure ML engine 402 and secure ML answer engine 406 may be arranged to support and enforce one or more privacy preserving machine learning (PPML) protocols. In some embodiments, the PPML protocol may enable the secure ML engine to provide ML classifications to client without disclosing the contents of the input data or the secure ML model details to the participants.

Accordingly, in one or more of the various embodiments, a machine learning platform may be arranged employ secure ML engine 402 and secure ML answer engine 406 to enable users to privately use one or more secure ML models. In some embodiments, clients may be enabled to provide one or more inputs for classification by one or more secure ML models such that the values of the one or more inputs are kept secret from everyone else.

Likewise, in one or more of the various embodiments, organizations may be enabled to securely provide tuned and trained ML models for use by others. Accordingly, in one or more of the various embodiments, clients may be enabled to use the secure ML model to classify their inputs but they will be unable to see or access the internal details of the secure ML models.

In one or more of the various embodiments, secure ML models may be associated with a parameter model that describes the structure or type of input data the secure ML model is compatible with. Also, in one or more of the various embodiments, parameter models may include additional meta-data that describes the secure ML model. This information may be employed by clients or the secure ML engine to select which secure ML model should be used to answer a client's question. Likewise, additional meta-data associated with a secure ML model may describe its price, classification accuracy, training level, age, names or descriptions of the type of classifications or answers, or the like.

In one or more of the various embodiments, secure ML engine 402 or secure ML answer engine 406 may be arranged to execute various cryptographic operations that enable a user (or client) to classify input data while keeping that the hidden from other parties, including the ML model owner. Accordingly, in one or more of the various embodiments, the secure ML engine may be arranged to support one or more MPC protocols that may enable the production of a classification result while protecting the contents of the client input data from being observed to discovered by the secure ML engine and the secure ML model owner. Also, in one or more of the various embodiments, the one or more MPC protocols may protect the details of secure ML model from the client and the secure ML engine.

Secure Machine Learning Protocols

In one or more of the various embodiments, secure ML engine 402 or secure ML answer engine 406 may be arranged to support one or more protocols that enable secure multi-party computation (MPC). In some embodiments, hardware or software modules, hardware or software plugins, software libraries, ASICs, or the like, or combination thereof, may be provided to support different MPC protocols. Thus, as additional MPC protocols are developed, corresponding hardware or software modules, hardware or software plugins, software libraries, ASICs, or the like, may be installed to provide secure ML engine 402 or secure ML answer engine 406 the ability to execute the additional MPC protocols. While some of these protocols are described in detail below, they should not be considered limiting because these innovations contemplate the use of additional protocols as needed for a given application. However, the described protocols are sufficient to enable one of ordinary skill in the art to practice these innovations. Further, for clarity and brevity, the operation of secure ML protocols may be described in terms of a client that is providing input data for classification and a secure ML model owner that owns the ML model being used to classify the provided input data. However, in some embodiments, secure ML engine 402 or secure ML answer 406 may be arranged to perform some or all of the protocol steps on behalf of the client or the secure ML model owner.

In one or more of the various embodiments, secure ML engine 402 or secure ML answer engine 406 may be arranged to employ additive secret sharing to perform computation modulo q. In one or more of the various embodiments, a value x may be secretly shared over $Z_q$ by picking uniformly at random subject to the constraint that $x = \Sigma_{i=0}^n x_i$ mod $Z_q$ and then distributing each share $x_i$ to each party $P_i$ (e.g., client and secure ML model owner). In some cases, $[x]_q$ may denote this secret sharing.

Also, in one or more of the various embodiments, secure ML engine 402 or secure ML answer engine 406 may be arranged to perform secure multiparty computation (MPC) addition. Accordingly, for example, Given $[x]_q$, $[y]_q$ and a constant c, it is trivial for two parties to compute a secret sharing $[z]_q$ corresponding to $z=x+y$, $z=x-y$, $z=cx$ or $z=x+c$. All of these operations may be performed locally without interaction between parties by simply adding, subtracting or multiplying the shares respectively for the first three cases and by having a pre-agreed party (e.g., secure ML answer engines) add the constant in the last case. Accordingly, in some embodiments, these operations may be denoted respectively by $[z]_q \leftarrow [x]_q + [y]_q$, $[z]_q \leftarrow [x]_q - [y]_q$, $[z]_q \leftarrow c[x]_q$ and $[z]_q \leftarrow [x]_q + c$ (one party). For a secret sharing $[x]_q$, the parties can open the value x by revealing their shares $x_i$.

Also, in one or more of the various embodiments, secure ML engine 402 or secure ML answer engine 406 may be arranged to perform secure multiple party computation (MPC) matrix multiplication. Accordingly, for example, in one or more of the various embodiments, the protocol may be parametrized by the size q of the selected ring and the dimensions (i, j) and (j, k) of the matrices, and runs with the parties $P_1, \ldots, P_n$. Thus, in some embodiments, a trusted secure ML answer engine or secure ML engine may be arranged to select uniformly random U and V in $Z_q^{i \times j}$ and $Z_q^{j \times k}$, respectively, compute W=UV and pre-distributes secret sharings $[U]_q$, $[V]_q$, $[W]_q$ to the parties. The parties (e.g., clients providing input data and secure ML model owners) have inputs $[X]_q \in Z_q^{i \times j}$, $[Y]_q \in Z_q^{j \times k}$ and interact as follows:

1) Locally compute $[D]_q = M_q - [U]_q$ and $[E]_q = [Y]_q - [V]_q$, then open D and E.

2) One party locally computes $[Z]_q = [W]_q + E[U]_q + D[V]_q + DE$, while the other computes $[Z]_q = [W]_q + E[U]_q + D[V]_q$, where $[Z]_q$ is a secret sharing of Z=XY.

Also, in one or more of the various embodiments, secure ML engine 402 or secure ML answer engine 406 may be arranged to perform oblivious input selection (OIS). Accordingly, for example, in one or more of the various embodiments, if a first party, designated as Alice (e.g., client providing the input data) provides an input vector of values, $x=(x_1, \ldots, x_n)$, and a second party, Bob (e.g., secure ML owner) has as input k, the index of the desired input value. In this example, let l be the bit length of the inputs to be shared and n be the dimension of the input vector provided by the client. Accordingly, in this example, a trusted initializer, such as secure ML engine 402 or secure ML answer engine 406 pre-distributes the correlated randomness necessary for the execution of OIS over $Z_2$. The protocol may proceed as follows:

1) Define $y_k=1$ and, for $j \in \{1, \ldots, n\} \setminus \{k\}$, $y_j=0$. For $j \in \{1, \ldots, n\}$ and $i \in \{1, \ldots, l\}$, let $x_{j,i}$ denote the i-th bit of $x_j$. Define $[y_j]_2$ as the pair of shares $(0, y_j)$ and $[x_{j,i}]_2$ as $(x_{j,i}, 0)$.

2) Compute in parallel $[z_i]_2 \leftarrow \Sigma_{j=1}^n [y_j]_2 [x_{j,i}]_2$ for i= 1, . . . , l.

3) Output $[z_i]_2$ for i∈{1, . . . , l}.

Also, in one or more of the various embodiments, secure ML engine 402 or secure ML answer engine 406 may be arranged to securely or privately execute one or more decision tree protocols associated with the secure ML model being used. Accordingly, for example, in one or more of the various embodiments, the first party, Alice (a client) may provide inputs x=(x$_1$, . . . , x$_n$)∈R and the secure ML answer engine will employ a secure ML model to provide a corresponding classification result such as true or false. In one or more of the various embodiments, the second party, Bob (which may be the secure ML engine or the secure ML model) provides the secure ML model D=(P, H, w), where P is the polynomial representation of the decision tree incorporated in the secure ML model, H is data structure arranged to map internal nodes of the secure ML model decision tree to specific input features provided in the input data by the client (e.g., Alice) and w may be a vector of threshold values that correspond the decision tree included in the secure ML model. Note, in one or more of the various embodiments, the decision tree is described as being "included" the secure ML model because in some embodiments a secure ML model may include more than one decision tree or additional model elements such as heuristics, filters, or the like, that may be evaluated separately.

In one or more of the various embodiments, the polynomial P may be a sum of terms such that each term corresponds to one possible path in the decision tree; in a binary classification tree, only the paths that lead to same result may be recorded (e.g., all paths that lead to true or all paths that lead to false). If a certain set of inputs followed one such path of the tree, the corresponding term would evaluate to one while the remaining terms evaluate to zero. For example, the decision tree model in FIG. 5 has three resulting comparisons when evaluating the tree, z1, z2, z3 and its polynomial would be $P(z_1, z_2, z_3) = \overline{z_1 z_2} + z_1 z_3$. For a value truth value or bit $\bar{a}$, we let a represent its negation.

Alice (e.g., the client) has as input a feature vector x and Bob (secure ML model owner) has a decision tree model D=(P,H,w). Alice and Bob proceed as follows:

1) Let n be the number of unique comparisons in p. For i=1, . . . , n, Alice and Bob obtain bitwise secret sharings of $x_{H(i)}$ by using OIS with inputs x$_1$, . . . , x$_n$ from Alice and input H(i) from Bob.

2) For i=1, . . . , n, Alice and Bob securely compare $x_{H(i)}$ and w$_i$. For the input w$_i$, Bob inputs its bit representation and Alice inputs zeros. Let $[z_i]_2$ denote the result.

3) Alice and Bob securely evaluate the polynomial P using secure addition and multiplication. Let $[\sigma]_2$ denote the result. $[\sigma]_2$ is then opened to Alice who reconstructs σ.

In one or more of the various embodiments, various step of the above described protocols may be compiled in one or more of software libraries, FPGAs, ASICs, instructions stored in EEPROMs, or the like, or combination thereof.

Figure 5:
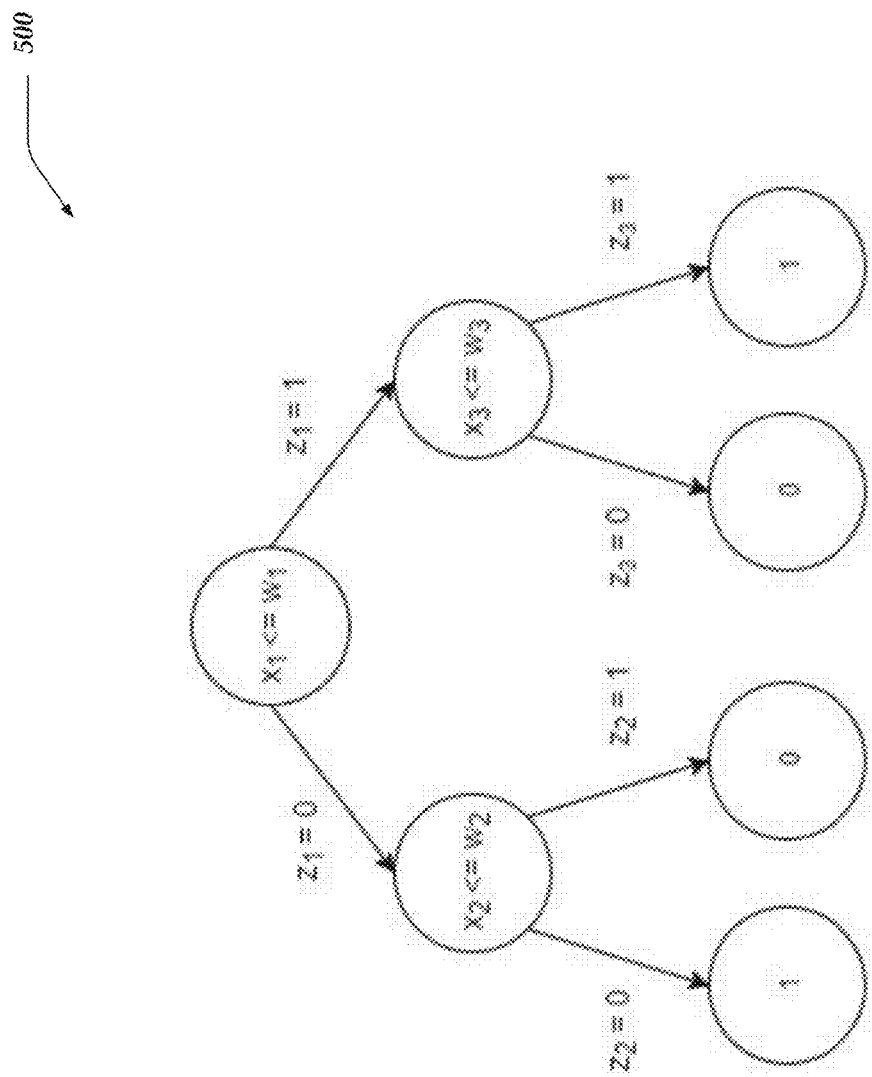
FIG. 5 illustrates a logical representation of a tree model that may be part of a secure ML model in accordance with one or more of the various embodiments.

FIG. 5 illustrates a logical representation of tree model 500 that may be part of a secure ML model arranged for tree-based classifiers in accordance with one or more of the various embodiments. Tree model 500 is referred to in the discussion above for FIG. 4. In one or more of the various embodiments, secure ML engines may be arranged to support ML models or tree models that have various shapes or structure. In one or more of the various embodiments, the secure multiparty computation methods used by a secure ML engine may be adapted or varied depending on the structure of a given secure ML model. In one or more of the various embodiments, the particular shape or structure of a given secure ML model may be shared with the secure ML engine to enable it select a MPC protocol that may be compatible with the secure ML model.

In one or more of the various embodiments, as described herein, secure ML engines may be arranged to identify one or more secure ML models that may be able to answer the client's question. Accordingly, in one or more of the various embodiments, the MPC protocol used to evaluate the client's input data may be different depending on the structure of the selected model.

In one or more of the various embodiments, the secure ML model may be associated with meta-data that identifies the type of structure of the model. Or, in some embodiments, the secure ML model or its corresponding parameter model may define one or more MPC protocols that it may be compatible with.

In one or more of the various embodiments, tree models representing decision trees, random forests, boosted decision tree models may include various data structures. For example, in some embodiments, tree models, such as tree model 500 may be represented in memory as a dictionary data structure. In some examples, tree models may be represent using and saved as a JSON string.

In one or more of the various embodiments, one or more tree models, such as, tree model 500 may be associated with a list of the class labels, the input features that the model requires (e.g., its parameter model), the weights/confidence of the trees, a list of the trees themselves, or the like. In some embodiments, the 'weights' field may be present if the tree model represents a boosted decision tree model. In one or more of the various embodiments, each tree model in a ML model ensemble may include contains the following properties:

Thresholds: A list of the thresholds for each node of the tree. The $i^{th}$ threshold corresponds to the $i^{th}$ feature. In some embodiments, there may be duplicate thresholds, but each feature/threshold pair may be a unique tuple. Let t$_i$ represent the threshold value of the $i^{th}$ node.

Features: A list of the feature names for each node in the tree. The $i^{th}$ feature corresponds to the $i^{th}$ threshold. There may be duplicate features, but each feature/threshold pair is a unique tuple and generally represents a unique node. In some cases, tree models may have nodes in different parts of the tree that have identical feature/threshold values. Accordingly, memory and processing resources may be optimized by storing the tuple once rather than multiple times. Let f represent the feature name of the $i^{th}$ node. Let the function H(i) return the index of the input feature for node i.

Polynomial: A mapping of the feature/threshold tuples into a representation of a tree. Consider each path in a tree from its root to one of its leaves a logical AND of the result from each node in the path. Accordingly, in some embodiments, this may be represented using a data structure, such as, an array of arrays where each internal array represents a path to a leaf in the tree and each value of the internal array is the index of the feature/threshold tuple for the node it represents. Let polynomials represent the nodal path of the $l^{th}$ leaf.

Inversions: An array of arrays with the same dimensions of the polynomial field. A value of 1 means the comparison result should be inverted. inversions$_{1,i}$ corresponds to polynomial$_{1,i}$ for l=0, . . . , $2^d$ Classifiers: An array of arrays where each internal array maps to the leaf of the tree whose nodal path is represented by the corresponding internal array of the 'polynomial' field. So the $i^{th}$ array of the 'classifier' field is the votes of the leaf attained by the threshold comparison of every node listed in the $i^{th}$ array of the 'polynomial' field evaluating to 1. The length of each internal array may be the same as the length of the 'classes' field in the tree model, since each element of the classifier's internal arrays is that leaf's vote to the corresponding class. In other words, each internal array corresponds to the probability distribution over the class labels in the leaf of a tree. Let classifier[i][c] be the vote for class c from leaf i.

Figure 6:
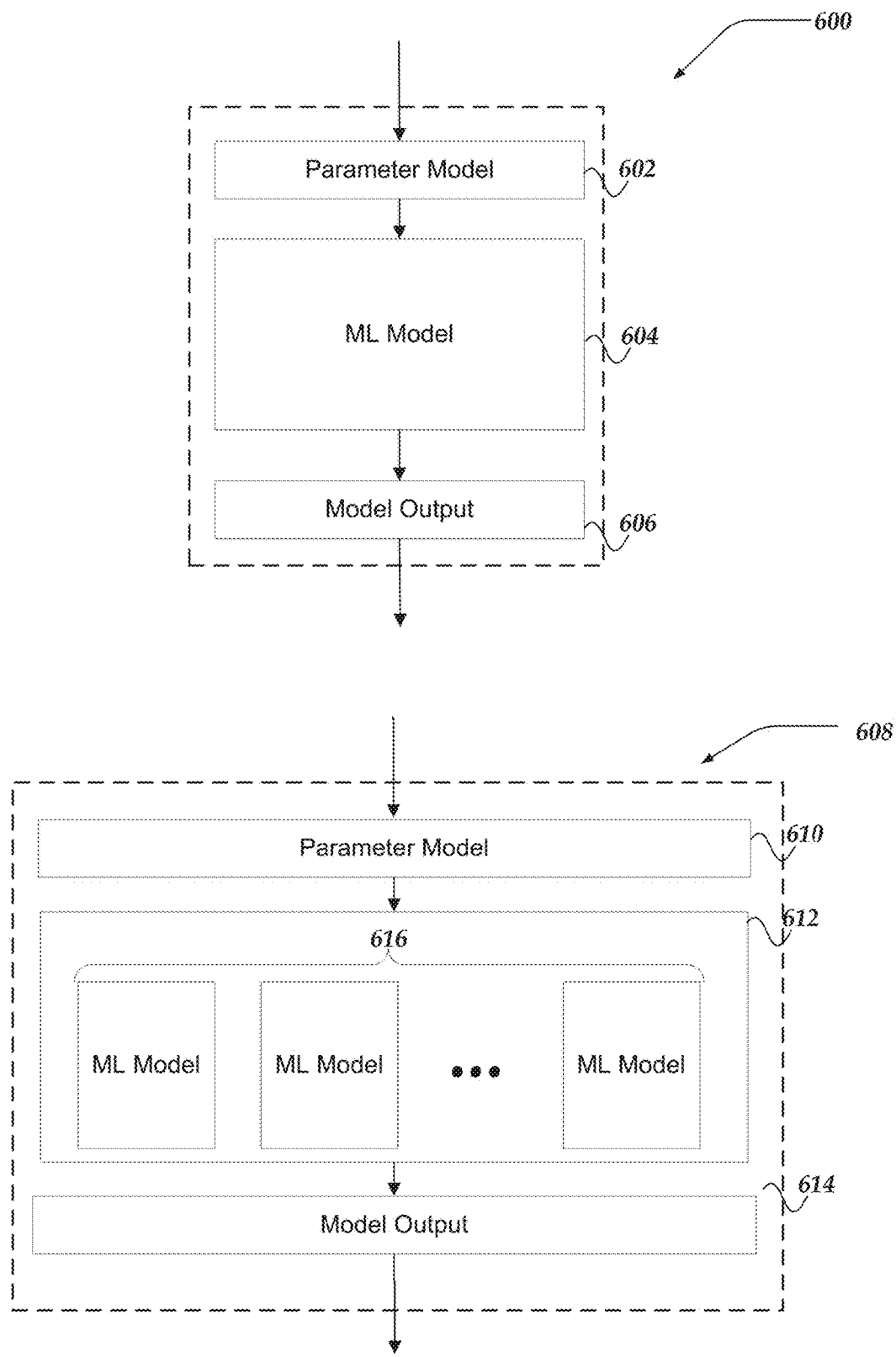
FIG. 6 illustrates logical representation of a machine learning (ML) model envelope for scoring model objects in accordance with one or more the various embodiments.

FIG. 6 illustrates logical representation of machine learning (ML) model envelope 600 for scoring model objects in accordance with one or more the various embodiments. In one or more of the various embodiments, ML model envelopes may be comprised of parameter model 602, secure ML model 604, model output 606, or the like.

In one or more of the various embodiments, a parameter model, such as parameter model 602 may be defined in terms of the model schema. In some embodiments, parameter model 602 may act as a guard that restricts which input data model objects may be provided to a secure ML model. In one or more of the various embodiments, parameter model 602 may identify one or more portions of a data model that may be provided to a particular secure ML model, such as secure ML model 604.

In one or more of the various embodiments, parameter models define the model objects that are compatible or eligible for classification or scoring using a given secure ML model. For example, in one or more of the various embodiments, parameter model 602 may be arranged to require model objects that conform to a requirements of secure ML model 604.

In one or more of the various embodiments, ML model 604 represents the actual machine learning model included in ML model envelope 600 that may be executed by a secure ML engine or secure ML answer engine. A secure ML model may accept the matching model objects that satisfy the parameter model and produce a result or classification result based on the provided model objects.

Accordingly, in one or more of the various embodiments, input data provided by a client for classification by to a secure ML answer engine may be transformed by an ingestion process to conform with a model object schema that is compatible with one or more parameter models for one or more secure ML models.

Further, in one or more of the various embodiments, a client may provide a parameter model that corresponds to its input data to the secure ML engine without exposing the contents or values of the input data. In some embodiments, the parameter model provided by the client may enable the secure ML engine to discover the type or structure of the input data without exposing the input data values.

In one or more of the various embodiments, the particular secure ML model or its underlying model implementation may be arbitrary as long as it accepts the model objects that satisfy its associated parameter model. For example, a simple secure ML model may be arranged to provide results that indicate if a patient is old or young. Accordingly, in this example, the secure ML model may include parameter model that requires a patient model object that includes an age value. Thus, in this trivial example, a secure ML model may be arranged to produce a true result if the age value is above a defined threshold. In contrast, in some embodiments, other secure ML models may have parameter models that require several complex model objects have many model object fields.

In one or more of the various embodiments, parameter model 602 may be used by a secure ML engine, such as secure ML engine 322, to select a secure ML model for the input data provided by a client.

In one or more of the various embodiments, secure ML models may be comprised of two or more other ML models. For example, ML model envelope 608 includes ML model 612 that is comprised of two or more ML models (e.g., ML models 616). Accordingly, in one or more of the various embodiments, parameter model 610 may be arranged to accept model objects conforming to data models that are required or compatible with the included ML models 616. Likewise, in one or more of the various embodiments, model object 614 may be arranged to produce output values based on a combination of sub-outputs produced by ML model 616. Note, the particular combination of the sub-outputs may be included as part of secure ML model 612 or model output 614 based on the application of secure ML model 612. In some embodiments, secure ML models that include more than one ML model may be arranged include rules that select one or more sub-outputs to include or combine into its ultimate output. For example, in some embodiments, secure ML model 612 may be arranged to exclude one or more outlying results and then provide a score that is based on an average of the remaining results. Likewise, in some embodiments, rules may employ dynamic programming such that one or more of the included secure ML models are used depending on the input parameter values.

Figure 7:
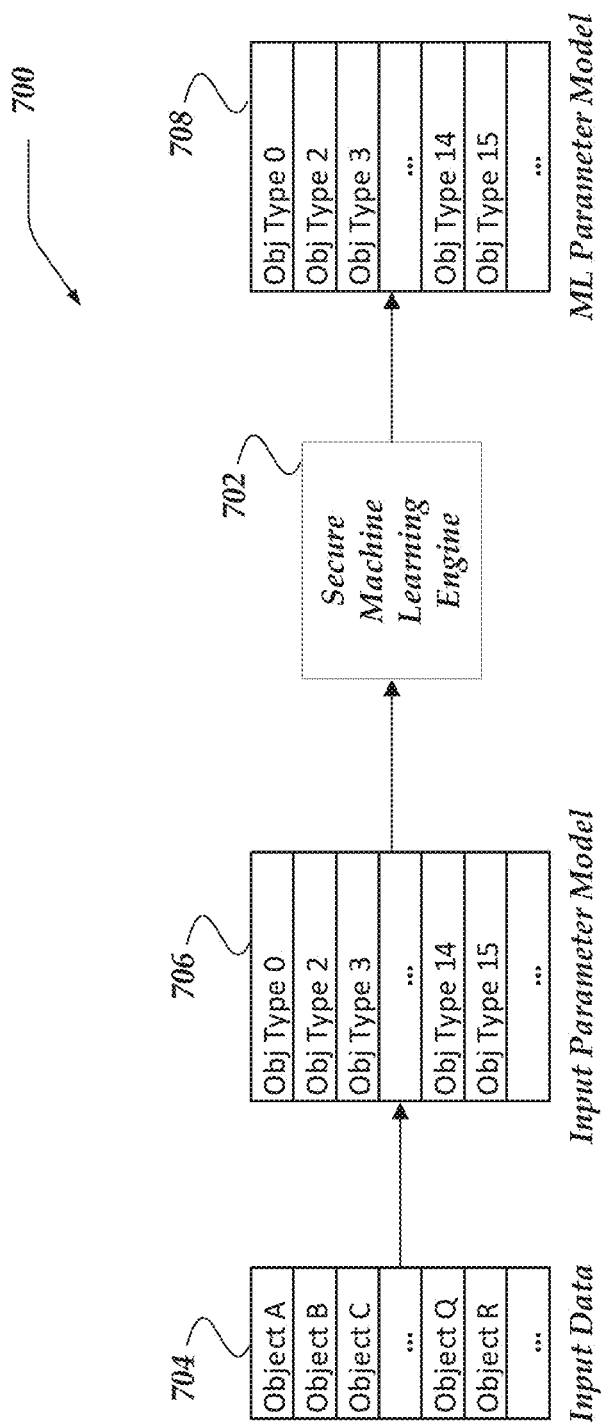
FIG. 7 illustrates a logical representation of s system for mapping input data to ML parameter models in accordance with one or more of the various embodiments.

FIG. 7 illustrates a logical representation of system 700 for mapping input data to ML parameter models in accordance with one or more of the various embodiments. In one or more of the various embodiments, client may provide secured or encrypted input data, such as input data 702. In one or more of the various embodiments, input data 704 may be arranged to conform a well-defined schema or model schema that is supported by secure ML engine 702. In one or more of the various embodiments, one or more ingestion engines, such as ingestion engine 324 may be arranged to conform input data to one or more ML model schemas supported by secure ML engine 702.

In one or more of the various embodiments, ingestion engines may be arranged to apply one or more rules or configuration information to transform, map, normalize, or otherwise conform the raw input data into input data compatible with the ML model schema.

In one or more of the various embodiments, input parameter model 706 represents a parameter model view of the input data. Essentially, input parameter model 706 represents various metadata, such as, data types, constraints, dependencies, or the like, that may be used by secure ML engine to identify, or select, one or more compatible/matching secure ML models. In one or more of the various embodiments, input parameter models, such as input parameter model 706 may be arranged to be separate from the input data values. Also, in some embodiments, input parameter models may be arranged to include the cryptographically secure (e.g., encrypted) values that correspond to the input value being provided by a client. However, in either case, the secure ML engine is arranged to read the schema information included in the parameter model. In some embodiments, the schema information in the parameter models may be arranged to include enough data type or data structure information the enable the secure ML engine to select one or more compatible secure ML models. Likewise, in one or more of the various embodiments, if particular secure ML model has already been selected, the input parameter model provided by the client may be compared with the parameter model of the secure ML model to confirm that the input data is compatible with the selected secure ML model.

In one or more of the various embodiments, input parameter models, such as input parameter model 706 may be provided to a secure ML engine, such as, secure ML engine 702. Accordingly, in some embodiments, secure ML engine 702 may be arranged to confirm that secure ML models required to classify the client provided input data may be compatible with the input parameter model provided by the client.

Figure 8A:
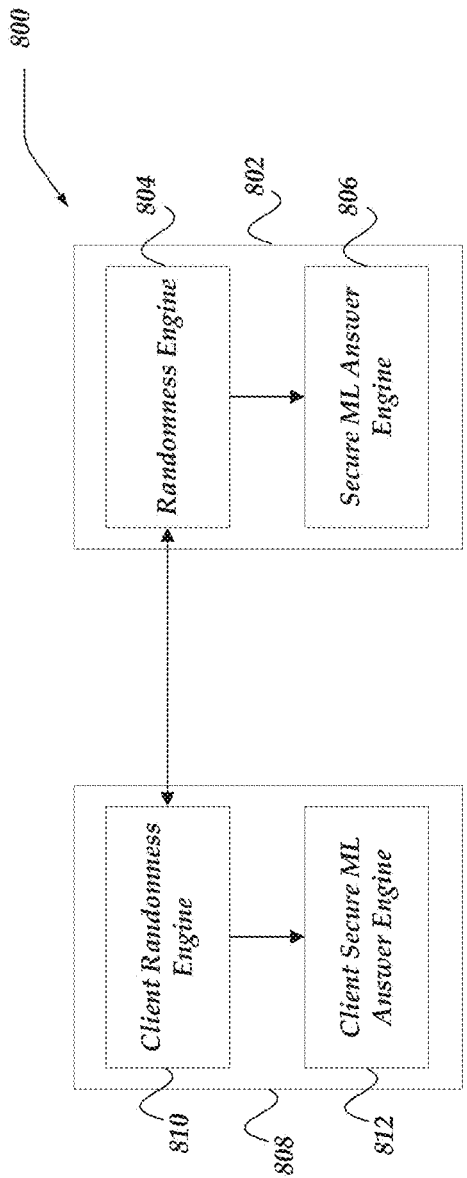
FIG. 8A illustrates a logical schematic of a system for cryptographically secure machine learning in accordance with one or more of the various embodiments.
Figure 8B:
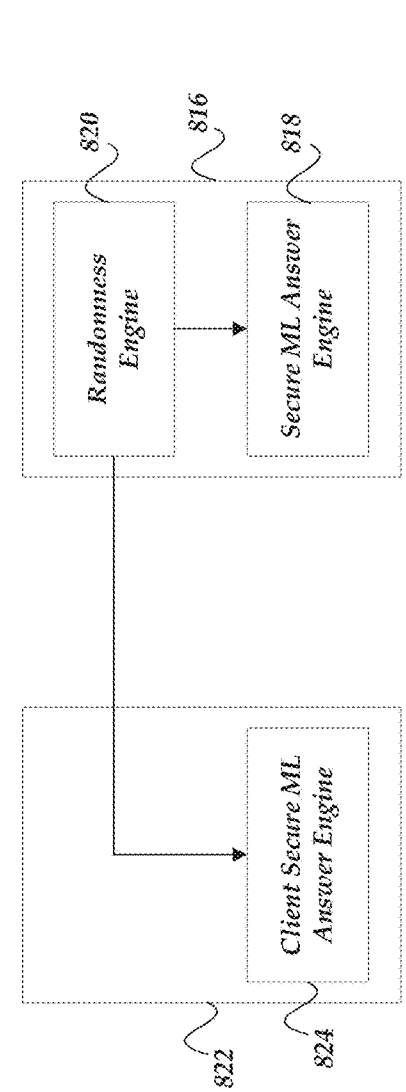
FIG. 8B illustrates a logical schematic of a system for cryptographically secure machine learning in accordance with one or more of the various embodiments.

FIGS. 8A and 8B illustrate logical schematics of different deployment arrangements that may be used by various embodiments for cryptographically secure machine learning.

FIG. 8A illustrates a logical schematic of system 800 for cryptographically secure machine learning in accordance with one or more of the various embodiments. in one or more of the various embodiments, randomness engines used to support secure cryptographic operations may be distributed among different parts of the system.

Accordingly, in one or more of the various embodiments, a server or platform hosts, such as server 802 may be arranged to include a randomness engine, such as, randomness engine 804. Also, in some embodiments, server 802 may be arranged to include a secure ML answer engine, such as, secure ML answer engine 806. Further, in one or more of the various embodiments, a client computer or client host, such as, client 808 may be arranged to include its own randomness engine, such as, client randomness engine 810 as well as a client secure ML answer engine, such as client secure ML answer engine 812.

In one or more of the various embodiments, the randomness engine on server 802 (e.g., randomness engine 804) may be arranged to communicate with the randomness engine on client 804 (e.g., client randomness engine 810). In one or more of the various embodiments, the randomness engines on server 802 and client 808 may be arranged to be compatible with each other such that they employ one or more protocols to establish randomness sufficient for cryptographically secure machine learning. In some embodiments, client randomness engine 810 and randomness engine 804 may be arranged to exchange handshake information used for initialization. In other embodiments, out-of-band initialization information may be provided to each randomness engine separately. For example, seeds, salts, protocols, pre-made random values, one-time pads, or the like, may be shared over a secure connection or by other methods, such as, hand-delivered data files.

In one or more of the various embodiments, secure ML answer engine 806 may be arranged to obtain randomness information from randomness engine 804. Similarly, in some embodiments, client secure ML engine 812 may be arranged to obtain randomness information from client randomness engine 810. In some embodiments, the different randomness engines may be co-located or otherwise locally deployed to support cryptographic operations. In other embodiments, randomness engine may be arranged to be distributed such that they still provide randomness information to one or more secure ML engines even though they are located or operating on different hosts or computers.

FIG. 8B illustrates a logical schematic of system 814 for cryptographically secure machine learning in accordance with one or more of the various embodiments. In one or more of the various embodiments, a randomness engine used to support secure cryptographic operations may be shared by different parts of the system.

Accordingly, in one or more of the various embodiments, server or platform hosts, such as server 816 may be arranged to include a randomness engine, such as, randomness engine 820. Also, in some embodiments, server 816 may be arranged to include a secure ML answer engine, such as, secure ML answer engine 818. Further, in one or more of the various embodiments, a client computer or client host, such as, client 822 may be arranged to include a client secure ML answer engine, such as client secure ML answer engine 824.

In one or more of the various embodiments, the randomness engine on server 816 (e.g., randomness engine 820) may be arranged to provide randomness information for both secure ML answer engine 806 and client secure ML answer engine 824

In some embodiments, similar to randomness engine 804, randomness engine 820 may be arranged to exchange handshake information used for initialization. For example, seeds, salts, protocols, pre-made random values, one-time pads, or the like.

In one or more of the various embodiments, secure ML answer engine 818 may be arranged to obtain randomness information from randomness engine 820. And, in some embodiments, client secure ML engine 824 may be arranged to also obtain randomness information from randomness engine 820. In some embodiments, the randomness engine may be co-located or otherwise included as part of the machine learning platform. In other embodiments, randomness engines may be located or operating on different services, hosts, or computers.

Figure 9:
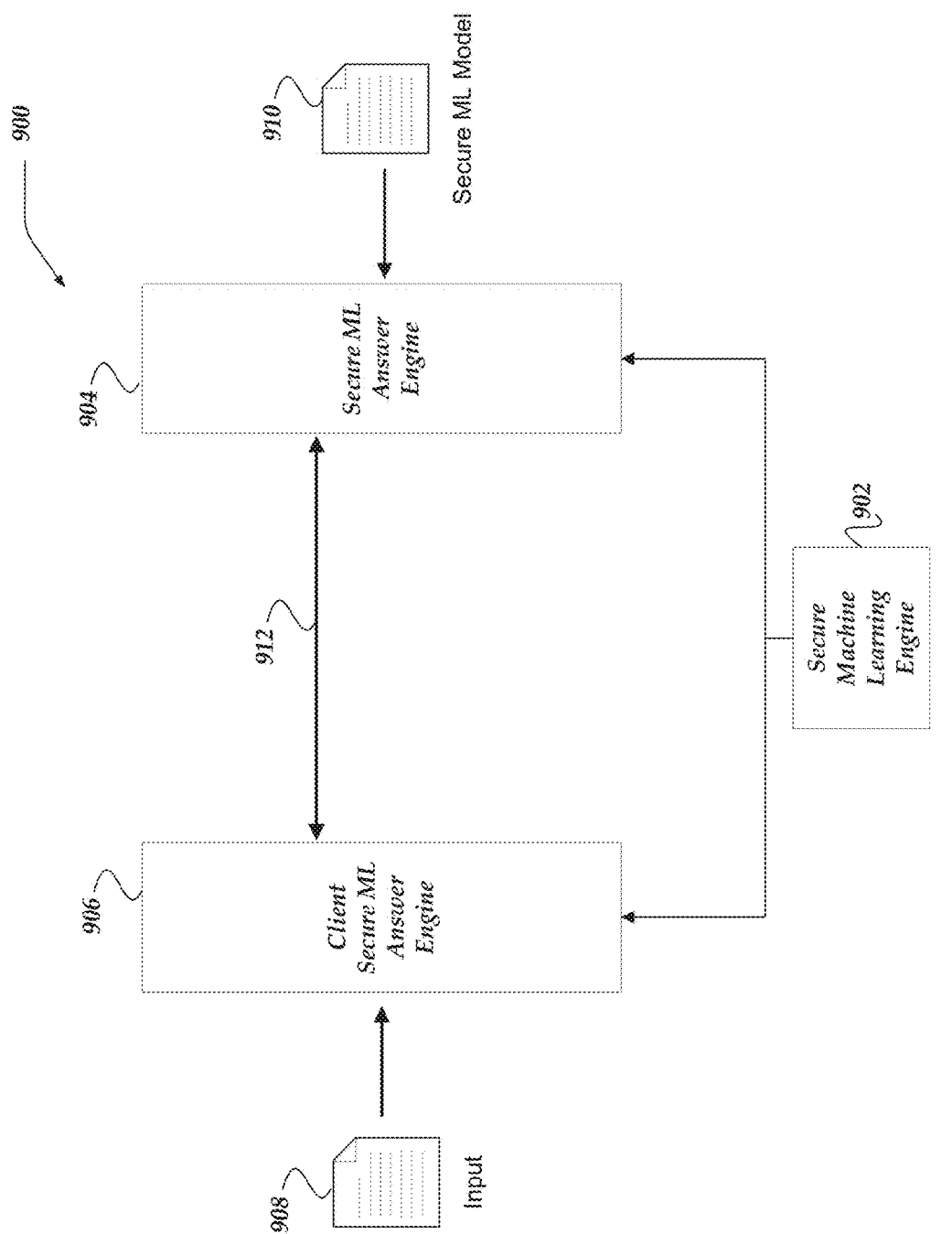
FIG. 9 illustrates a logical schematic of a system for cryptographically secure machine learning in accordance with one or more of the various embodiments.

FIG. 9 illustrates a logical schematic of system 900 for cryptographically secure machine learning in accordance with one or more of the various embodiments. In one or more of the various embodiments, system 900 may include secure ML engine 902, secure ML answer engine 904, client secure ML answer engine 906, input data 908, secure ML model 910, or the like.

In one or more of the various embodiments, secure ML answer engines, such as secure ML answer engine 904 may be arranged to execute one or more cryptographic operations to support the one or more secure multiparty computation (MPC) protocols used as part of cryptographically secure machine learning. In some embodiments, engines for the client or server may be distributed to different hosts or processes. Accordingly, in this example, client secure ML answer engine 906 is shown separate from secure ML answer engine 402 to represent this type of embodiment. Likewise, in one or more of the various embodiments, one or more secure ML answer engines may be arranged to perform operations for both the client and server.

In one or more of the various embodiments, secure ML engines, such as secure ML engine 902 may be arranged to compute or distribute pre-computed cryptographic information to clients, servers, secure ML answer engines, or the like, or combination thereof. Accordingly, in one or more of the various embodiments, secure ML engine 904 may be arranged to pre-compute cryptographic information, such as, randomness, public/private key pairs, homomorphic encryption shares, or the like, that may be shared with one or more service ML answer engines as needed.

For example, in one or more of the various embodiments, pre-computing homomorphic encryption shares improves the operation of secure ML model answer engines 902 by enabling secure classification to be performed faster since the most time consuming cryptographic operations are performed before users submit inputs to be classified.

In one or more of the various embodiments, secure machine learning 902 may be arranged to facilitate or coordinate the operations to enable secure ML answer engine 904 and client secure ML answer engine 906 to securely classify inputs (e.g. input 908) provided by a client using secure ML model 910.

As described above, secure ML model 910 represents a trained secure ML model that is cryptographically secured such that neither secure ML answer engine 904 nor the client or client secure ML answer engine 906 are able to observe the internal details of the trained models.

In one or more of the various embodiments, the secure ML model may be arranged to publish or otherwise expose its parameter model and other shape information (e.g., type of model, type of classifiers, or the like) that enable the client to prepare its input data for classification.

In one or more of the various embodiments, the client may be arranged to share a parameter model that represents or describes the type or structure of the input data without exposing the values of the input data. Accordingly, in one or more of the various embodiments, secure ML engine 902 may be arranged to identify one or more secure ML models, such as, secure ML model 910 that may be capable of answering the question (e.g., performing the classification) requested by the client. In some embodiments, the secure ML model may be selected or requested by a client. In such cases, in some embodiments, the secure ML engine may be arranged to confirm that the input data is compatible with the selected secure ML model by comparing the parameter model provided by the client with the parameter model associated with the selected secure ML model.

In one or more of the various embodiments, after the client has provided a parameter model and question and the secure ML engine has selected an appropriate secure ML model, the client secure ML answer engine and the secure ML answer engine work together to securely compute an answer to the client question (e.g., classify the input provided by the client) using one or more secure multiparty computation protocols.

In this example, for one or more of the various embodiments, communication channel 912 represents a channel used by secure ML engine 902 to coordinate with client secure ML answer engine 906 and secure ML answer engine 904. For example, answer engines may exchange partial parameters, partial values, partial model elements, randomness information, or the like, as part of computation of the answer.

In one or more of the various embodiments, the particular workflow, operations, or the like, to execute secure multiparty computation may depending on the particular protocols being used. In some embodiments, one or more clients or one or more secure ML models may be arranged to require particular protocols be used. For example, the structure or shape of a given secure ML model may require particular secure protocols. Likewise, in some embodiments, in some cases the input data, the ML model, or the application may require enhanced security (or less security). Accordingly, in one or more of the various embodiments, meta-data associated with the input data, the ML model, or the application may define which protocol should be used. In one or more of the various embodiments, secure ML engine 902, secure ML answer engine 904, or client secure ML answer engine 906 may be arranged to employ configuration information provided via configuration files, rule-based policies, plugins, loadable libraries, built-ins, or the like, to execute the steps and workflows required by the selected protocols.

Generalized Operations

Figure 10:
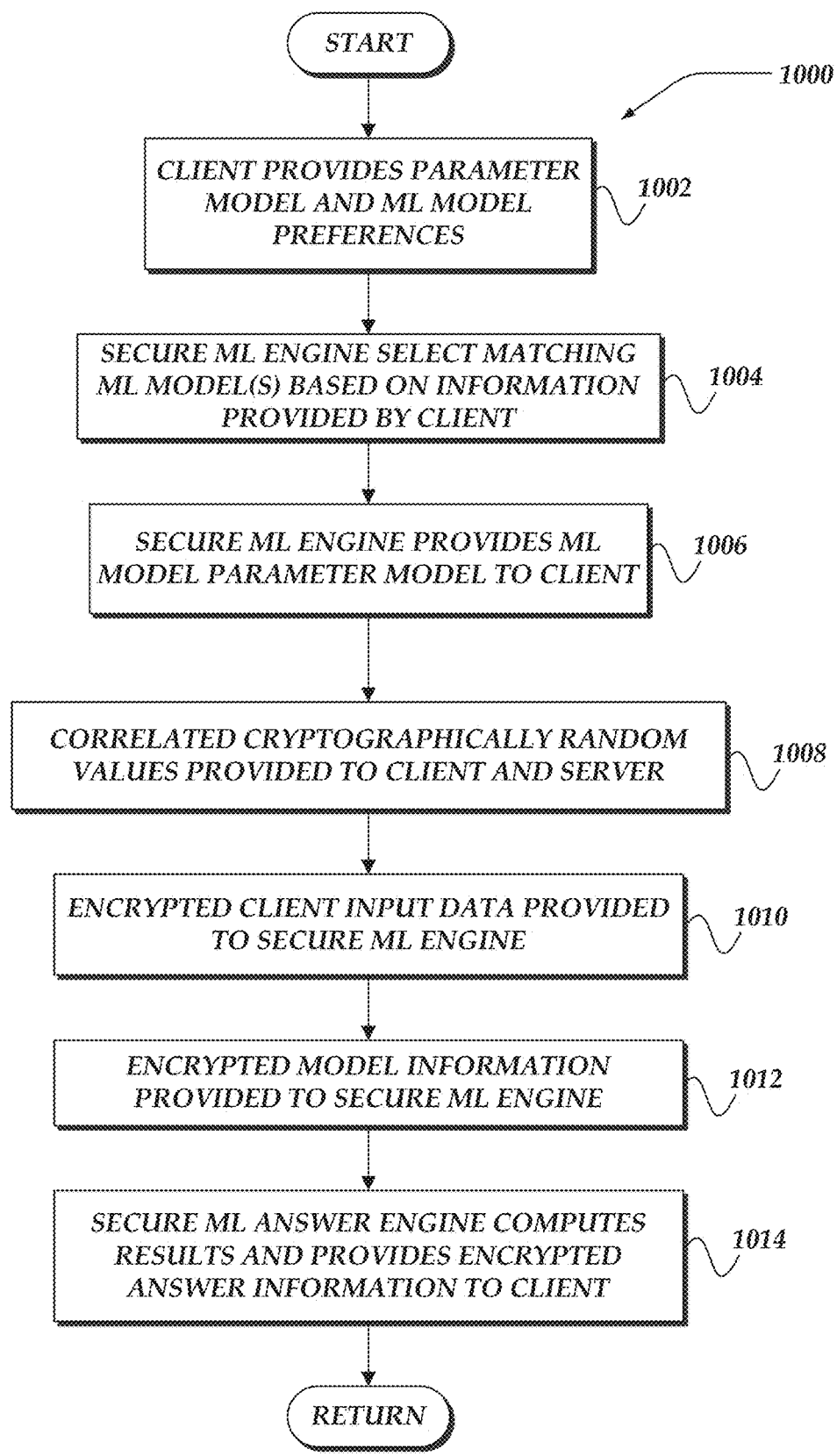
FIG. 10 illustrates an overview flowchart for process 1000 for a cryptographically secure machine learning (ML) in accordance with one or more of the various embodiments.
Figure 11:
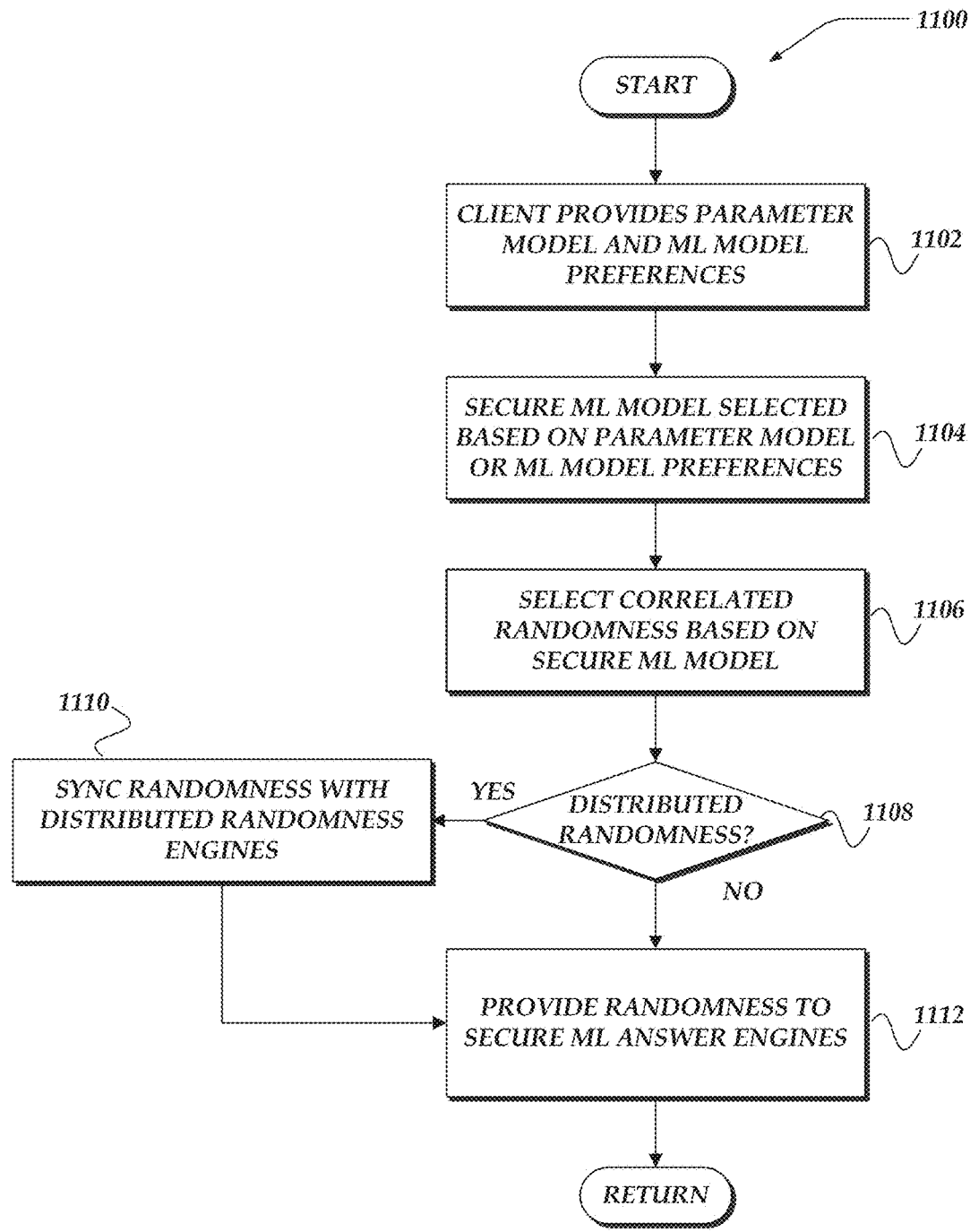
FIG. 11 illustrates an overview flowchart for a process for a cryptographically secure machine learning (ML) in accordance with one or more of the various embodiments.
Figure 12:
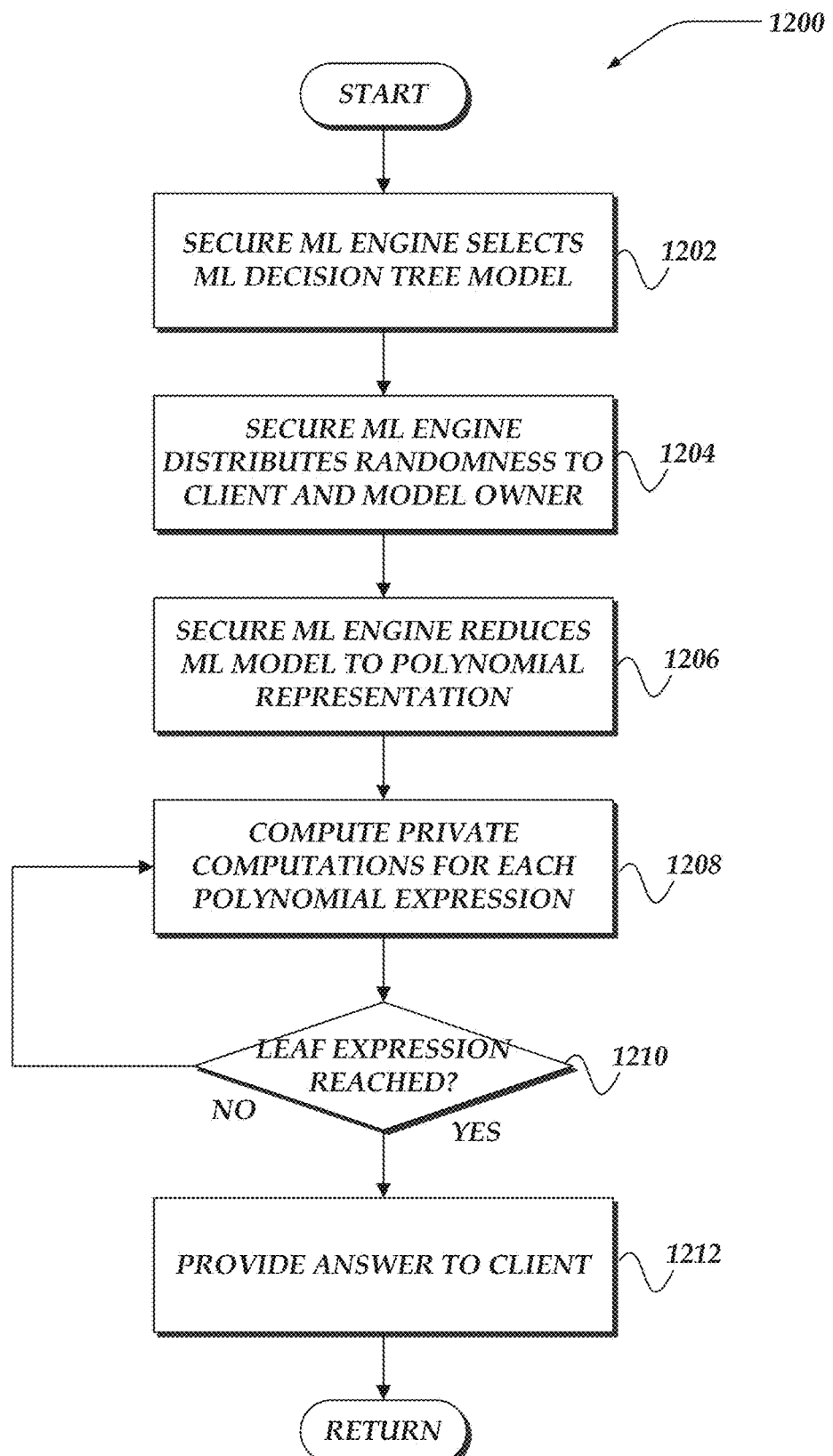
FIG. 12 illustrates a flowchart for a process for a computing an answer using cryptographically secure machine learning (ML) in accordance with one or more of the various embodiments.

FIGS. 10-12 represent the generalized operations for a cryptographically secure machine learning in accordance with at least one of the various embodiments. In one or more of the various embodiments, processes 1000, 1100, and 1200 described in conjunction with FIGS. 10-12 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. Further, one or more of the various embodiments, the processes described in conjunction with FIGS. 10-12 may be operative in a machine learning platform such as described in conjunction with FIGS. 4-9.

FIG. 10 illustrates an overview flowchart for process 1000 for a cryptographically secure machine learning (ML) in accordance with one or more of the various embodiments. After a start block, at block 1002, in one or more of the various embodiments, a client may provide a parameter model and ML model preference to a secure ML engine. As described above, parameter models may be used to define or describe the input data types or input data structures that may be compatible with one or more ML model. In some embodiments, clients may be provided a published API information that describes the parameter models that may be accepted by the secure machine learning platform.

Also, in one or more of the various embodiments, secure ML models available to the client may be arranged to describe the parameter models that they may accept. Also, in one or more of the various embodiments, secure ML models that are available to clients may be arranged to expose information that describes the types of questions (e.g., classifications) the secure ML model can answer. In some embodiments, secure ML models may expose additional data such as the type of ML model, owner of the ML model, age or version of the ML model, precision or confidence ratings, or the like. Also, In some cases, different ML models may be associated with a price or price plan. Accordingly, in one or more of the various embodiments, if providing input data or a question, clients may declare a maximum price they are willing pay to answer the question. Thus, in some embodiments, if the secure ML engine discovers two or more secure ML models that otherwise meet the client's criteria, the price of using a secure ML model may be an additional criteria for selecting a secure ML engine.

At block 1004, in one or more of the various embodiments, the secure ML engine may be arranged to identify or select one or more ML models based on the information provided by the client. In one or more of the various embodiments, the secure ML engine may query a database of ML models to identify if one or more ML models may be available to answer the client's question.

Accordingly, in one or more of the various embodiments, the secure ML engine may query for ML models that answer the client's question and support the parameter model(s) supported by the client. Likewise, in some embodiments, if the client has provided additional criteria, the secure ML engine may be arranged to locate or identify one or more qualifying ML models.

In some cases, for some embodiments, two or more ML models may match the client's requirements. Accordingly, in some embodiments, the secure ML engine may be arranged to employ one or more defined rules to select one of the ML models. For example, in some embodiments, a rule may declare that if two or more ML models satisfy the client's requirements, the newest ML model should be used. Other examples, of selection rules may include: selecting the most precise ML model, selecting the least expensive (e.g., lowest cost) ML model, selecting the most popular ML model, asking for user input to make the selection, or the like, from among the two or more matching ML models.

In one or more of the various embodiments, such rules may be included in configuration information that may be modified or customized for different ML models, model owners, clients, questions, or the like. In some embodiments, the clients may provide rules, rule preferences, or rule information as part of the model preferences it provides to the secure ML engine.

In one or more of the various embodiments, the client may provide two or more parameter models that represent different types of input the client may provide. Accordingly, the secure ML model may select a ML model that matches at least one of the parameter models provided by the client.

At block 1006, in one or more of the various embodiments, the secure ML engine may provide a ML model parameter model to the client. The provided parameter model may be consistent or compatible with the parameter model provided by the client.

In one or more of the various embodiments, the parameter model provided to the client defines the type data types, fields, data structure, or the like, that may be compatible with the question or input data provided by the client.

At block 1008, in one or more of the various embodiments, correlated cryptographically random values may be provided to the client and server. In one or more of the various embodiments, the secure ML protocols being used may require correlated random values. Accordingly, in some embodiments, the secure ML engine may be arranged to employ a randomness engine to generate the necessary values and to manage the distribution of the random values for use by client secure ML answer engines, secure ML answer engines, or the like.

In one or more of the various embodiments, because one or more of the secure ML protocols supported by a secure ML engine may use random values (e.g., randomness) in well-defined ways, the secure ML engine or the randomness engine may be arranged to generate some or all of the correlated values in advance of when or if they are needed. In such cases, the secure ML engine (via its randomness engine) may be arranged to keep track of which random values have been used. In some embodiments, policies may be defined to establish rules for handling randomness. For example, rules may be employed to define various properties or features, such as, the number of random values to compute in advance, ages or timeouts of values, re-use policies, strength policies (e.g., bit length of random numbers, entropy, entropy sources, or the like), rollover policies, or the like.

At block 1010, in one or more of the various embodiments, the encrypted client input may be provided to the secure ML engine. As described above, clients provide the input data that they are asking a question about. In some embodiments, the question may be considered a classification problem. In one or more of the various embodiments, the input data may be encrypted before providing it to a secure ML engine or secure ML answer engine. In some embodiments, the input data may be kept at the client. In such cases, the client may employ a client secure ML answer engine works with a secure ML answer engine hosted or provided by the secure ML engine that performs the secure ML protocols.

In one or more of the various embodiments, the input data may be transformed to conform with a parameter model(s) that the secure ML engine or the secure ML model requires. Accordingly, in some embodiments, the input data may comprise of one or more model objects that represent one or more entities the client is interested in classifying or otherwise evaluating.

In one or more of the various embodiments, the client may trust the secure ML platform. Accordingly, in some embodiments, the client may provide the input data to the secure ML engine or secure ML answer without encrypting it first. However, in some embodiments, the network connection used to communicate the input data from the client to the secure ML platform may be secured using TLS, secure VPNs, or the like.

At block 1012, in one or more of the various embodiments, the encrypted secure ML model information may be provided to the secure ML engine. In one or more of the various embodiments, the secure ML model owner may have previously registered or published the secure ML model to a ML model repository managed or otherwise accessible by the secure ML engine. In some embodiments, the secure ML engine may obtain the secure ML model after a client requests to use it.

In one or more of the various embodiments, the secure ML platform may enable the secure ML model owner to keep possession of the secure ML model. Accordingly, the secure ML model owner may share one or more parameter models that may be compatible with their secure ML models rather than sharing the entire secure ML model.

In one or more of the various embodiments, if the secure ML model owner does not want share the secure ML model, one or more portions of a secure ML answer engine may be hosted on a computer controlled by the secure ML model owner. Accordingly, in some embodiments, the secure computation protocols may be employed while the secure ML model remains in the possession of the secure ML model owner.

At block 1014, in one or more of the various embodiments, the secure ML answer engine may compute the answer results and provide encrypted answer information the client. As described above, the secure ML platform may be enable to support one or more secure multiparty computation protocols. Accordingly, in one or more of the various embodiments, the secure ML platform (e.g., secure ML answer engines) may be arranged to execute the protocols that are compatible or required by the current operation. For example, in one or more of the various embodiments, the client, the secure ML model owner, the secure ML platform, or the like, may provide configuration directives that may define the type of secure protocol that may be followed. In some embodiments, one or more components may be configured to support two or more protocols. Accordingly, in one or more of the various embodiments, the secure ML engine may be arranged to perform negotiation actions or handshake actions that are performed to select a particular secure protocol that may be compatible with all the involved parties. Upon successful execution of the secure computation protocol steps, a result may be provided to the client as an answer to its question.

Next, control may be returned to a calling process.

FIG. 11 illustrates an overview flowchart for process 1100 for a cryptographically secure machine learning (ML) in accordance with one or more of the various embodiments. After a start block, at block 1102, in one or more of the various embodiments, a client may provide a parameter model and ML model preference to a secure ML engine. In one or more of the various embodiments, the client selects input data and a question to answer using one or more secure ML models. In this context, a question refers to a request to classify, score, or otherwise, evaluate the input data using one or more secure ML models. For example, a client may wish to classify patients as high risk or low risk for some bad outcome. Accordingly, in this example, the input data would include a model objects that correspond to the patient. However, the values of the of the model object fields for the client's patient may be sensitive such that the client does not want to share the patient's details. Also, in some embodiments, as mentioned above, there may be additional metadata or ML model preferences that may be associated with a client's request for an answer.

At block 1104, in one or more of the various embodiments, a secure ML model may be selected based on the parameter model or model preferences provided by the client. In one or more of the various embodiments, the secure ML engine may be arranged to search one or more secure ML model repositories to identify secure ML models that a compatible with the client's request. In some embodiments, the secure ML engine may be arranged to query one or more third-party repositories for compatible secure ML models. In some embodiments, in addition to its question and parameter model, the client request may include information that narrows or restricts the search for compatible secure ML models, such as, price, precision, model type, acceptable ML model sources or owners, or the like.

In one or more of the various embodiments, the actual secure ML models may be stored separately from the secure ML engine. For example, in some embodiments, the secure ML model may register information (e.g., parameter models, supported questions, or the like) with the secure ML engine that may be used for identify secure ML models that may be compatible with the client's question. Accordingly, in one or more of the various embodiments, if a remotely stored secure ML model is selected for use, the secure ML engine may retrieve from its remote location. In some embodiments, the secure ML model may be hosted on resources controlled by its owner. In such cases, for some embodiments, a secure ML answer engine may be deployed to resources controlled by the secure ML model owner to execute the secure multiparty computations necessary compute an answer to the client's question.

At block 1106, in one or more of the various embodiments, optionally, correlated randomness may be selected by on the secure ML model. In one or more of the various embodiments, the secure ML engine may select or compute one or more random values or randomness based on the secure machine learning protocols being used to answer the question.

In one or more of the various embodiments, this block is indicated as being optional because in some cases, for some protocols distributing random values to the client or others may be unnecessary. For example, in some cases, the randomness may be distributed beforehand. In other cases, the randomness may be obtained from a third-party or external service.

At decision block 1108, in one or more of the various embodiments, if distributed randomness is used, control may flow to block 1110; otherwise, control may flow to block 1112. In one or more of the various embodiments, two or more randomness engine may be distributed to different parts of the system. For example, in some embodiments, a client secure ML answer engine and a randomness engine may be hosted on client computers or compute resource while a secure ML answer engine and another randomness engine may be hosted on a secure ML owner's computers or compute resources.

At block 1110, in one or more of the various embodiments, randomness information used by the client and server may be synced. In one or more of the various embodiments, syncing may include incrementing an index counter or iterator on each of the distributed randomness engine to ensure that they stay synchronized. Because, in one or more of the various embodiments, randomness engines may be supplying correlated randomness to support MPC or other secure protocols. Accordingly, in some embodiments, if correlated randomness is requires, the random values provided to the client and the random values provided to the secure ML answer engine or the secure ML model owner are arranged to be used together. Thus, in one or more of the various embodiments, the secure ML engine tracks which random values are used by which client to comply with defined randomness policies.

In one or more of the various embodiments, the syncing process may be a message sent to the randomness engines that indicates that the next set of random values for a MPC calculation should be used. In some embodiments, a single randomness engine may be used to distribute the necessary random values to each participant in the secure multiparty computations.

At block 1112, in one or more of the various embodiments, the randomness information may be provided the client secure ML answer engine and the server secure ML answer engine. In one or more of the various embodiments, the randomness information may be communicated over a network, or otherwise shared with the client secure ML answer engine and the server secure ML answer engine. Next, control may be returned to a calling process.

FIG. 12 illustrates a flowchart for process 1200 for a computing an answer using cryptographically secure machine learning (ML) in accordance with one or more of the various embodiments. After a start block, at block 1202, in one or more of the various embodiments, the secure ML engine may select a ML decision tree model. In this example, it can be assumed that the client provided a question request that resulted in a secure ML model being selected that included one or more decision tree models. At block 1204, in one or more of the various embodiments, the secure ML engine may distribute randomness information to a client that is requesting an answer and the model owner. In one or more of the various embodiments, the distributed randomness may be correlated random data that may be used for secure multiparty computation. At block 1206, in one or more of the various embodiments, the secure ML engine may process the provide ML model to reduce it its polynomial representation. As described above (e.g., FIG. 4 and FIG. 5) the decision tree may be reduced to a polynomial representation. In some embodiments, the decision tree model may be stored in a polynomial format that may be used rather having to perform the transformation each time it is used. At block 1208, in one or more of the various embodiments, private computations for each polynomial expression may be computed. At decision block 1210, in one or more of the various embodiments, if a leaf expression is reached, control may flow to block 1212; otherwise, control may flow to block. At block 1212, in one or more of the various embodiments, the answer may be provided to the client. Next, control may be returned to a calling process.

It will be understood that each block of the flowchart illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

The above specification, examples, and data provide a complete description of the manufacture and use of the composition of the invention. Since many embodiments of the invention can be made without departing from the spirit and scope of the invention, the invention resides in the claims hereinafter appended.

Representative Protocol Implementation Use Case

In one or more of the various embodiments, a protocol for cryptographically secure machine learning may include: (1) Requested ML model and data are piped into the client side secure multiparty computation evaluator as a j son string in the following format: {"cmd": "score", "modelName": "name", "modelID": "id", "data": {"feature$_1$":value$_1$, . . . , "feature$_n$": value$_n$}}. The model name and id are model identifiers that may be used to identify the of model the client is requesting.

(2) The client side evaluator sends the server side evaluator the list of variable names in their given order of evaluation: ["feature$_1$", . . . , "feature$_n$"]v (3) Score model. If the model is an Adaboost model and has tree confidence values, the confidence values may be used to multiplied into the classifiers of each tree before starting the multiparty computation scoring on data. Each tree may be scored in parallel, or tree scoring may be performed serially.

(a) For each tree, the server side evaluator sends the dimensions of the 'polynomial' field to the client side evaluator. This leaks the depth of the tree—the only information that the client ever learns about the model.

(b) For i=1, . . . , $2^d$+1, the client and the server obtain bitwise secret sharings of $x_{H(i)}$ by executing an oblivious input selection protocol with inputs $x_1$, . . . ; $x_n$ from the client and input H(i) from the server.

(c) For i=1, . . . , $2^d$+1, securely compare $x_{H(i)}$ and $t_i$. For the input $t_i$, the server inputs its bit representation and the client inputs zeros. Let $[[z_i]]_2$ denote the result.

(d) Create a double array comps with dimensions identical to the polynomial field. For i=1, . . . , $2^d$ and j=1, . . . , d (where d is the depth of the $i^{th}$ leaf):

$$comps[i][j] = x_{H(polynomial[i][j])} \oplus inversions[i][j].$$

(e) For i=1, . . . , $2^d$ and j=2, . . . , d, perform multi-party bitwise AND of the comparison results: comps[i][1]=comps[i][1]comps[i][1]. Rounds may be reduced by ANDing one half of comps[i] with the other half and repeating until there is one element remaining. Thus comps[i][1] now holds the resulting shares for the selection of leaf i. If comps[i][1] was opened now, its value would be 1 while the rest are 0. The corresponding i that contains the value 1, is the selected leaf for the tree.

(f) Create an integer array leafsel for i=1, . . . , $2^d$, store leafsel[i]=−comps[i][1]. Now the bits of each element in leafsel are either all ones or all zeroes. By securely ANDing leafsel[i] with each vote of classifier[i], all classifiers maybe masked out except the one for the tree's resolving leaf. Since the votes are stored as bitwise shares of the value, they may be XOR'd with the corresponding votes from each leaf into one final classifier that contains the votes from the unmasked leaf.

(g) When all the trees have been scored and the shares of each final classifier have been calculated, the corresponding 'votes' from each tree are added together via bitwise addition.

(h) Perform a secure argmax function to select the index k of the highest vote.

(i) Open k to the client. The client can then get class[k] from the known list of classes.

What is claimed as new and desired to be protected by Letters Patent of the United States is:

1. A method for classifying data over a network using one or more processors, included in one or more network computers, to perform actions, comprising:
employing a machine learning (ML) engine to perform actions, including:
selecting an ML model that employs a cryptographic multi-party computation (MPC) protocol based on model preferences provided by a client, wherein the provided model preferences include both a question and a parameter model, and wherein the parameter model includes one or more model objects of the ML model, and wherein the ML engine uses the parameter model to define one or more input values that are compatible with the ML model;
employing a randomness engine to perform actions, including:
providing one or more random values and one or more other random values based on the cryptographic MPC protocol, wherein the one or more random values are provided to the client and the one or more other random values are provided to an answer engine;
distributing a first instance of the randomness engine and a first random information datastore to the client, wherein the one or more random values are provided from the first random information datastore; and distributing a second instance of the randomness engine and a second random information datastore to the answer engine, wherein the one or more other random values are provided from the second random information datastore; and employing the answer engine to perform further actions, including:

synchronizing the first random information datastore and second random information datastore to maintain a correlation between the one or more random values and the one or more other random values;

receiving, from the client, a data model having model objects that include the one or more input values that correspond to one or more fields of the one or more model objects in the parameter model, wherein the one or more input values are based on the cryptographic MPC protocol and the one or more random values;

determining compliance of the data model with one or more requirements of the ML model based on a comparison of the data model to the parameter model;

in response to the data model complying with the one or more requirements of the ML model, providing one or more partial results to the question based on the ML model, the one or more input values, and the cryptographic MPC protocol; and providing the one or more partial results to the client, wherein a ML client engine provides one or more answers to the question based on the one or more partial results.

2. The method of claim 1, wherein employing the randomness engine to perform further actions, includes:

generating randomness information that includes the one or more random values and the one or more other random values based on the cryptographic MPC protocol;

storing the randomness information in a persistent data store;

discarding the one or more random values from the persistent datastore as they are provided to the client; and discarding the one or more other random values from the persistent datastore as they are provided to the answer engine.

3. The method of claim 1, wherein the one or more random values and the one or more other random values are correlated with each other based on the cryptographic MPC protocol.

4. The method of claim 1, wherein the selecting the ML model, further comprises:

comparing the parameter model with one or more other parameter models that are associated with one or more ML models, wherein the one or more ML models remain encrypted during the comparison; and selecting the ML model from the one or more ML models based on the comparison.

5. The method of claim 1, wherein providing the one or more partial results to the question, further comprises:

evaluating nodes of one or more decision trees included in the ML model by computing secure partial results that correspond to each node of the one or more decision trees;

generating a polynomial from the secure partial results that represents a path through the one or more decision trees; and providing the polynomial to the client and the answer engine, wherein the terms of the polynomial are secured using the cryptographic MPC protocol.

6. The method of claim 1, wherein providing the one or more partial results to the question, further comprises, evaluating one or more of, one or more decision tree models, one or more random forest models, one or more heuristics, or one or more filters, that are included in the selected ML model.

7. The method of claim 6, wherein the one or more input values are secured using oblivious input selection.

8. A system for classifying data over a network, comprising:

a network computer, comprising:

a memory that stores at least instructions; and one or more processor devices that execute instructions that perform actions, including:

employing a machine learning (ML) engine to perform actions, including:

selecting an ML model that employs a cryptographic multi-party computation (MPC) protocol based on model preferences provided by a client, wherein the provided model preferences include both a question and a parameter model, and wherein the parameter model includes one or more model objects of the ML model, and wherein the ML engine uses the parameter model to define one or more input values that are compatible with the ML model;

employing a randomness engine to perform actions, including:

providing one or more random values and one or more other random values based on the cryptographic MPC protocol, wherein the one or more random values are provided to the client and the one or more other random values are provided to an answer engine;

distributing a first instance of the randomness engine and a first random information datastore to the client, wherein the one or more random values are provided from the first random information datastore; and distributing a second instance of the randomness engine and a second random information datastore to the answer engine, wherein the one or more other random values are provided from the second random information datastore; and employing the answer engine to perform further actions, including:

synchronizing the first random information datastore and second random information datastore to maintain a correlation between the one or more random values and the one or more other random values;

receiving, from the client, a data model having model objects that include the one or more input values that correspond to one or more fields of the one or more model objects in the parameter model, wherein the one or more input values are based on the cryptographic MPC protocol and the one or more random values;

determining compliance of the data model with one or more requirements of the ML model based on a comparison of the data model to the parameter model;

in response to the data model complying with the one or more requirements of the ML model, providing one or more partial results to the question based on the ML model, the one or more input values, and the cryptographic MPC protocol; and providing the one or more partial results to the client; and a client computer, comprising:

a client computer memory that stores at least instructions; and one or more processor devices that execute instructions that perform actions, including:

providing the question and the parameter model; and employing a ML client engine to provide one or more answers to the question based on the one or more partial results.

9. The system of claim 8, wherein employing the randomness engine to perform further actions, includes:

generating randomness information that includes the one or more random values and the one or more other random values based on the cryptographic MPC protocol;

storing the randomness information in a persistent data store;

discarding the one or more random values from the persistent datastore as they are provided to the client; and discarding the one or more other random values from the persistent datastore as they are provided to the answer engine.

10. The system of claim 8, wherein the one or more random values and the one or more other random values are correlated with each other based on the cryptographic MPC protocol.

11. The system of claim 8, wherein the selecting the ML model, further comprises:

comparing the parameter model with one or more other parameter models that are associated with one or more ML models, wherein the one or more ML models remain encrypted during the comparison; and selecting the ML model from the one or more ML models based on the comparison.

12. The system of claim 8, wherein providing the one or more partial results to the question, further comprises:

evaluating nodes of one or more decision trees included in the ML model by computing secure partial results that correspond to each node of the one or more decision trees;

generating a polynomial from the secure partial results that represents a path through the one or more decision trees; and providing the polynomial to the client and the answer engine, wherein the terms of the polynomial are secured using the cryptographic MPC protocol.

13. The system of claim 8, wherein providing the one or more partial results to the question, further comprises, evaluating one or more of, one or more decision tree models, one or more random forest models, one or more heuristics, or one or more filters, that are included in the selected ML model.

14. The system of claim 8, wherein the one or more input values are secured using oblivious input selection.

15. A processor readable non-transitory storage media that includes instructions for classifying data over a network, wherein execution of the instructions by one or more hardware processors performs actions, comprising:

employing a machine learning (ML) engine to perform actions, including:

selecting an ML model that employs a cryptographic multi-party computation (MPC) protocol based on model preferences provided by a client, wherein the provided model preferences include both a question and a parameter model, and wherein the parameter model includes one or more model objects of the ML model, and wherein the ML engine uses the parameter model to define one or more input values that are compatible with the ML model;

employing a randomness engine to perform actions, including:

providing one or more random values and one or more other random values based on the cryptographic MPC protocol, wherein the one or more random values are provided to the client and the one or more other random values are provided to an answer engine;

distributing a first instance of the randomness engine and a first random information datastore to the client, wherein the one or more random values are provided from the first random information datastore; and distributing a second instance of the randomness engine and a second random information datastore to the answer engine, wherein the one or more other random values are provided from the second random information datastore; and employing the answer engine to perform further actions, including:

receiving, from the client, a data model having model objects that include the one or more input values that correspond to one or more fields of the one or more model objects in the parameter model, wherein the one or more input values are based on the cryptographic MPC protocol and the one or more random values;

synchronizing the first random information datastore and second random information datastore to maintain a correlation between the one or more random values and the one or more other random values;

determining compliance of the data model with one or more requirements of the ML model based on a comparison of the data model to the parameter model;

in response to the data model complying with the one or more requirements of the ML model, providing one or more partial results to the question based on the ML model, the one or more input values, and the cryptographic MPC protocol; and providing the one or more partial results to the client, wherein a ML client engine provides one or more answers to the question based on the one or more partial results.

16. The media of claim 15, wherein employing the randomness engine to perform further actions, includes:

generating randomness information that includes the one or more random values and the one or more other random values based on the cryptographic MPC protocol;

storing the randomness information in a persistent data store;

discarding the one or more random values from the persistent datastore as they are provided to the client; and discarding the one or more other random values from the persistent datastore as they are provided to the answer engine.

17. The media of claim 15, wherein the one or more random values and the one or more other random values are correlated with each other based on the cryptographic MPC protocol.

18. The media of claim 15, wherein the selecting the ML model, further comprises:
comparing the parameter model with one or more other parameter models that are associated with one or more ML models, wherein the one or more ML models remain encrypted during the comparison; and
selecting the ML model from the one or more ML models based on the comparison.

19. The media of claim 15, wherein providing the one or more partial results to the question, further comprises:
evaluating nodes of one or more decision trees included in the ML model by computing secure partial results that correspond to each node of the one or more decision trees;
generating a polynomial from the secure partial results that represents a path through the one or more decision trees; and
providing the polynomial to the client and the answer engine, wherein the terms of the polynomial are secured using the cryptographic MPC protocol.

20. The media of claim 15, wherein providing the one or more partial results to the question, further comprises, evaluating one or more of, one or more decision tree models, one or more random forest models, one or more heuristics, or one or more filters, that are included in the selected ML model.

21. A network computer for classifying data over a network, comprising:
a memory that stores at least instructions; and
one or more processor devices that execute instructions that perform actions, including:
employing a machine learning (ML) engine to perform actions, including:
selecting an ML model that employs a cryptographic multi-party computation (MPC) protocol based on model preferences provided by a client, wherein the provided model preferences include both a question and a parameter model, and wherein the parameter model includes one or more model objects of the ML model, and wherein the ML engine uses the parameter model to define one or more input values that are compatible with the ML model;
employing a randomness engine to perform actions, including:
providing one or more random values and one or more other random values based on the cryptographic MPC protocol, wherein the one or more random values are provided to the client and the one or more other random values are provided to an answer engine;
distributing a first Ma instance of the randomness engine and a first random information datastore to the client, wherein the one or more random values are provided from the first random information datastore; and
distributing a second instance of the randomness engine and a second random information datastore to the answer engine, wherein the one or more other random values are provided from the second random information datastore; and
employing the answer engine to perform further actions, including:
synchronizing the first random information datastore and second random information datastore to maintain a correlation between the one or more random values and the one or more other random values;
receiving, from the client, a data model having model objects that include the one or more input values that correspond to one or more fields of the one or more model objects in the parameter model, wherein the one or more input values are based on the cryptographic MPC protocol and the one or more random values;
determining compliance of the data model with one or more requirements of the ML model based on a comparison of the data model to the parameter model;
in response to the data model complying with the one or more requirements of the ML model, providing one or more partial results to the question based on the ML model, the one or more input values, and the cryptographic MPC protocol; and
providing the one or more partial results to the client, wherein a ML client engine provides one or more answers to the question based on the one or more partial results.

22. The network computer of claim 21, wherein employing the randomness engine to perform further actions, includes:
generating randomness information that includes the one or more random values and the one or more other random values based on the cryptographic MPC protocol;
storing the randomness information in a persistent datastore;
discarding the one or more random values from the persistent datastore as they are provided to the client; and
discarding the one or more other random values from the persistent datastore as they are provided to the answer engine.

23. The network computer of claim 21, wherein the one or more random values and the one or more other random values are correlated with each other based on the cryptographic MPC protocol.

24. The network computer of claim 21, wherein the selecting the ML model, further comprises:
comparing the parameter model with one or more other parameter models that are associated with one or more ML models, wherein the one or more ML models remain encrypted during the comparison; and
selecting the ML model from the one or more ML models based on the comparison.

25. The network computer of claim 21, wherein providing the one or more partial results to the question, further comprises:
evaluating nodes of one or more decision trees included in the ML model by computing secure partial results that correspond to each node of the one or more decision trees;
generating a polynomial from the secure partial results that represents a path through the one or more decision trees; and providing the polynomial to the client and the answer engine, wherein the terms of the polynomial are secured using the cryptographic MPC protocol.

26. The network computer of claim 21, wherein providing the one or more partial results to the question, further comprises, evaluating one or more of, one or more decision tree models, one or more random forest models, one or more heuristics, or one or more filters, that are included in the selected ML model.

* * * * *